United States Patent
Takaoka

[11] Patent Number: 6,137,626
[45] Date of Patent: Oct. 24, 2000

[54] OPTICAL SYSTEM HAVING POLARIZATION COMPENSATING OPTICAL SYSTEM

[75] Inventor: Hideyuki Takaoka, Hachioji, Japan

[73] Assignee: Olympus Optical Co., Ltd., Tokyo, Japan

[21] Appl. No.: 09/102,767

[22] Filed: Jun. 23, 1998

[30] Foreign Application Priority Data

Jun. 24, 1997 [JP] Japan ................................. 9-167360
Jan. 12, 1998 [JP] Japan ................................. 10-003985

[51] Int. Cl.$^7$ ............................................. G02B 21/06
[52] U.S. Cl. ..................... 359/386; 359/351; 359/371; 359/499; 355/53
[58] Field of Search .................................. 359/351, 371, 359/386, 499; 355/53

[56] References Cited

U.S. PATENT DOCUMENTS

| | | | |
|---|---|---|---|
| 2,303,906 | 12/1942 | Benford et al. | 359/386 |
| 2,936,673 | 5/1960 | Hyde et al. | 359/386 |
| 3,052,152 | 9/1962 | Koester | 359/386 |
| 5,303,001 | 4/1994 | Jeong et al. | 355/53 |

FOREIGN PATENT DOCUMENTS

| | | |
|---|---|---|
| 37-5782 | 6/1937 | Japan . |
| 52-37784 | 9/1977 | Japan . |

*Primary Examiner*—Cassandra Spyrou
*Assistant Examiner*—Craig Curtis
*Attorney, Agent, or Firm*—Pillsbury Madison & Sutro LLP

[57] ABSTRACT

An optical system having a polarization compensating optical system capable of compensating for retardation with high accuracy. The polarization compensating optical system includes a half-wave plate (22), a first optical system (23*a*) having at least one uncoated refracting surface (26, 27), and a second optical system (23*b*) having at least one coated refracting surface (24, 25). The total rotation of the polarization plane introduced in rays passing through the entire optical system is reduced to approximately zero by rotation of the polarization plane produced by the first optical system (23*a*), and the total retardation introduced in the rays is reduced to approximately zero by retardation produced by the second optical system (23*b*).

2 Claims, 14 Drawing Sheets

OPTICAL SYSTEM HAVING POLARIZATION COMPENSATING OPTICAL SYSTEM

BACKGROUND OF THE INVENTION

1. Field of the Invention

The present invention relates to an optical system having a polarization compensating optical system. More particularly, the present invention relates to a polarizing microscope or the like having a polarization compensating optical system capable of compensating for retardation with high accuracy.

2. Description of the Related Art

In optical apparatuses designed to observe even slight changes in the state of polarization, e.g. polarizing microscopes, it is important to hold the plane of polarization with high accuracy in the optical system. However, when light rays are incident on the lens surface of the optical system, the polarization plane may be disordered to a considerable extent, depending upon the incident angle and azimuth angle of the rays. Therefore, extinction cannot be achieved in a polarizing microscope, for example, even if it adopts the crossed Nicol arrangement, in which a polarizer and an analyzer are arranged such that their transmission axes are perpendicular to each other.

FIG. 30 schematically shows the optical system of a polarizing microscope. The optical system includes a light source 1, a collector lens 2, a polarizer 3, a condenser 4, a specimen 5, an objective 6, an analyzer 7, and an image-forming lens 8. Thus, an enlarged image for observation of the specimen 5 is formed. The axis of vibration of the polarizer 3 extends in the direction indicated by the arrow 10. The direction of the vibration axis of the analyzer 7 is as indicated by the arrow 11. Thus, the polarizer 3 and the analyzer 7 are arranged in crossed Nicol relation to each other. The pupil intensity distribution after the passage of light through the analyzer 7 is as shown in FIG. 31. Thus, not the entire pupil is shielded, but light leaks through peripheral portions of the pupil, as shown by white regions in the figure. Consequently, a dark cross-shaped pattern, which is called "isogyre", appears.

FIG. 32 shows a ray incident on the objective 6. The arrow 12 in the figure indicates the direction of the incident ray, and θ represents the azimuth angle of the incident ray. If the ray is linearly polarized light vibrating in the direction indicated by the arrow 13, the polarized light is decomposable into p-polarized light 14 and s-polarized light 15. In general, p-polarized light and s-polarized light are different in transmittance from each other. Therefore, after the polarized light ray has passed through the objective 6, the direction of vibration of the polarized light does not coincide with the direction 13. Accordingly, complete extinction cannot be achieved even if the crossed Nicol arrangement is adopted. Therefore, in the case of a polarizing microscope designed to observe even slight birefringence from the specimen 5, the observability of the microscope is restricted to a considerable extent by the disordered polarization plane.

A polarization compensating optical element called a "rectifier" is known as an optical element that suppresses the rotation of the polarization plane. The technique concerning the polarization compensating optical element is disclosed, for example, in Japanese Patent Post-Exam Publication No. 37-5782. According to the disclosed technique, an optical element of refracting power zero is inserted in front of the condenser or behind the objective, together with a λ/2 wave plate. The optical element has approximately the same polarizing characteristics as those of the condenser or the objective. In the case of a rectifier for the objective, for example, rays first pass through the objective, and the objective rotates the polarization plane of the rays. Then, the rays pass through the λ/2 wave plate. Consequently, the direction of vibration of polarized light changes to a direction symmetric with respect to the original axis of vibration (the axis of vibration of the polarizing plate). Thereafter, the rays pass through the optical element of refracting power zero. Consequently, the rotation of the polarization plane produced by the optical element cancels the reverse rotation of the polarization plane produced by the objective. Thus, the direction of the polarization plane of the rays emerging from the rectifier becomes approximately equal to that of the rays before entering the objective. Accordingly, the use of such a rectifier makes it possible to compensate for the rotation of the polarization plane produced by the objective or the condenser.

Japanese Patent Post-Exam Publication No. 52-37784 discloses another technique of suppressing the rotation of the polarization plane. According to the disclosed technique, coating is provided on an annular region of a lens within an area extending from 0.7 to 1 time the effective diameter of the lens. Parameters of the coating are calculated and optimized so that the difference in transmittance between p-polarized light and s-polarized light produced by the coating cancels the rotation of the polarization plane produced by the optical system to be compensated.

In general, objective and condenser lens systems are each provided with coating in order to increase the transmittance thereof. When rays are incident on the coated surface at an incident angle other than zero degree, the phase difference between the p- and s-polarized light components of the incident rays is changed by multiple interference in the coating. Therefore, when linearly polarized light whose p- and s-polarized light components are not zero is incident on the coated surface, for example, transmitted light rays generally become elliptically polarized light.

Thus, when light rays pass through such a coated optical system, the state of polarization is disordered by the above-described two causes: (a) the rotation of the polarization plane due to the transmittance difference between the p- and s-polarized light components; and (b) the phase difference (retardation) introduced between the p- and s-polarized light components by the coated surface.

In an objective or condenser whose numerical aperture is not so large, the amount of retardation produced therein is not large because the incident angle of light rays entering the lens surface is relatively small. Therefore, even if incident linearly polarized light is changed to elliptically polarized light by the retardation, the ellipticity is relatively small, and thus it can be regarded as substantially remaining linearly polarized. Accordingly, if the above-described rectifier is used to compensate for the disordered polarization plane, the cause (a) of disordering the state of polarization is eliminated. Thus, the use of the rectifier is effective to a certain extent.

However, in the case of an objective or condenser having a large numerical aperture, the incident angle of light rays entering the lens surface is large, and the amount of retardation produced therein increases. Further, such an objective or condenser uses an increased number of lens elements to correct aberrations in the whole lens system and has an increased number of coated surfaces to be passed by rays. Therefore, the retardation increases cumulatively. Consequently, the cause (b) of disordering the polarization plane becomes so large that it cannot be disregarded. Thus, it is difficult to compensate for the disordered state of polarization completely simply by eliminating the cause (a) of disordering the polarization plane using the polarization compensating optical element as disclosed in Japanese Patent Post-Exam Publication No. 37-5782 and so forth.

Thus, it is necessary to eliminate both the above-described causes (a) and (b) in order to compensate for the disordered state of polarization. One example of the technique of solving the problems is disclosed in U.S. Pat. No. 3,052,152. The disclosed technique uses the above-described rectifier to eliminate the rotation (a) of the polarization plane. Further, it cancels the retardation (b) by providing a phase difference such as to cancel the introduced retardation using a phase plate, e.g. a birefringent material. However, such a phase plate provides the same phase difference over the entire aperture of the lens system. A ray passing through each point in the aperture repeats incidence and refraction with various angles at the refracting surface of the lens. Therefore, rays passing through each point in the aperture have different amounts of retardation. Accordingly, this method is effective only for rays passing through a part of the aperture.

According to the above-described Japanese Patent Post-Exam Publication No. 52-37784, a multilayer coating consisting of at least two layers is provided on an annular region of a lens. The annular region lies within an area extending from 0.7 to 1 times the effective diameter of the lens. The multilayer coating is designed to suppress both rotation of the polarization plane and retardation as much as possible. Therefore, the coating design is very complicated.

In view of the above-described problems associated with the prior art, an object of the present invention is to provide a polarization compensating optical system capable of compensating for retardation with high accuracy. Another object of the present invention is to provide a polarization compensating optical system capable of favorably compensating for both rotation of the polarization plane and retardation, thereby improving the polarization performance to a considerable extent.

SUMMARY OF THE INVENTION

To attain the above-described objects, the present invention provides an optical system having a polarization compensating optical system. The polarization compensating optical system has at least one refracting surface provided with a coating. The total retardation introduced in rays passing through the entire optical system, including the polarization compensating optical system, is reduced to approximately zero by retardation produced by the polarization compensating optical system.

In addition, the present invention provides an optical system having a polarization compensating optical system. The polarization compensating optical system includes a half-wave plate, a first optical system having at least one uncoated refracting surface, and a second optical system having at least one refracting surface provided with a coating. The total rotation of the polarization plane introduced in rays passing through the entire optical system, including the polarization compensating optical system, is reduced to approximately zero by rotation produced by the first optical system. The total retardation introduced in the rays passing through the entire optical system is reduced to approximately zero by retardation produced by the second optical system.

The above-described optical system having a polarization compensating optical system may be an illumination optical system or image-forming optical system of a microscope optical system. Polarization compensation may be performed independently for the illumination optical system or the image-forming optical system. FIGS. 1 to 7 illustrate examples in which polarization compensation is performed independently for an objective 6 as an image-forming optical system. Similarly, polarization compensation can be performed independently for an illumination optical system.

The above-described optical system having a polarization compensating optical system may be an optical system including both an illumination optical system and image-forming optical system of a microscope optical system. Polarization compensation for the entire optical system may be performed in either the illumination optical system or the image-forming optical system. An example of this arrangement is shown in FIG. 8. FIG. 8 shows an illumination optical system and image-forming optical system of a microscope optical system, which include a condenser 4, a specimen 5 and an objective 6. According to the above-described arrangement of the present invention, the total rotation of the polarization plane introduced by the condenser 4 and the objective 6 can be canceled substantially by rotation of the polarization plane produced by a first optical system 23a having lens surfaces 26 to 29. Further, the total retardation introduced by the condenser 4 and the objective 6 can be substantially canceled by retardation produced by a second optical system 23b having lens surfaces 24 and 25. Accordingly, polarization compensation for the entire optical system, which includes the illumination optical system and the image-forming optical system, can be accomplished by a polarization compensating optical system 23a+23b which is provided only in the illumination optical system. Although in FIG. 8 the polarization compensating optical system is provided in the illumination optical system, it may be provided in the image-forming optical system.

By using the above-described optical system having a polarization compensating optical system, it is possible to provide a microscope capable of obtaining images of high contrast, particularly in microscopic observation using the polarization interferometry or the differential interferometry.

The above-described optical system having a polarization compensating optical system may be used in a birefringence measuring apparatus. By doing so, it is possible to provide a birefringence measuring apparatus capable of measuring an index of double refraction or retardation with high accuracy.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DETAILED DESCRIPTION OF THE
PREFERRED EMBODIMENTS

Figure 1:
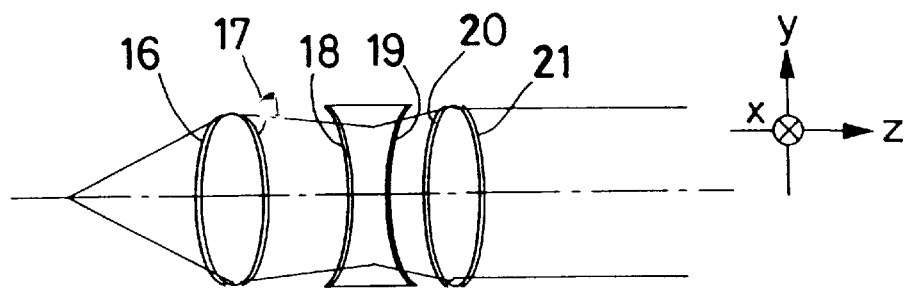
FIG. 1 is a sectional view showing an example of an objective to be compensated for retardation according to the present invention.
Figure 9:
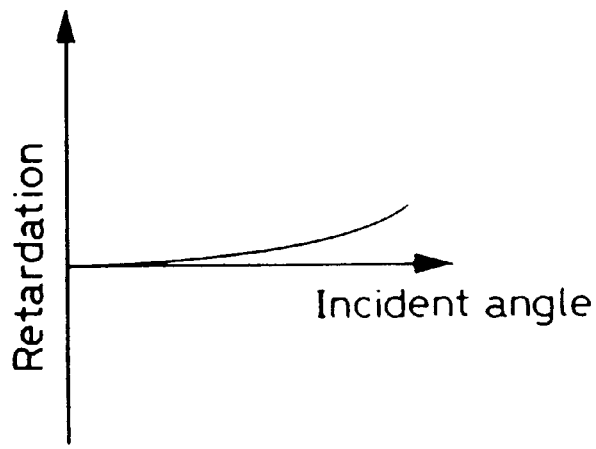
FIG. 9 is a diagram showing an example of retardation produced by a single-layer coating.
Figure 10:
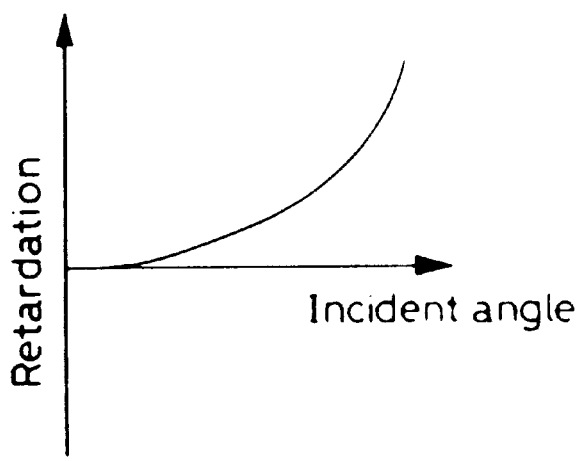
FIG. 10 is a diagram showing retardation accumulated in rays passing through the objective shown in FIG. 1.

First, the operation of the optical system according to the present invention will be described below. Let us consider an objective as shown in the sectional view of FIG. 1, for example. In general, when a single kind of coating is simply provided on all lens surfaces 16 to 21 in FIG. 1 without regarding the effect of retardation, the retardation between p- and s-polarized light components increases cumulatively in proportion to the number of lens surfaces. For example, let us consider a case where glass is provided with as a general antireflection coating a single-layer coating having a refractive index smaller than the refractive index of glass constituting a coated surface. In this case, the amount of phase difference (retardation) between the p- and s-polarized light components of the transmitted light rays is generally expressed as shown in FIG. 9 with respect to the incident angle of the rays. If this coating is used for all the lens surfaces, retardations are accumulated. Consequently, after passage through the objective, retardation such as that shown in the graph of FIG. 10 has been accumulated.

Figure 11:
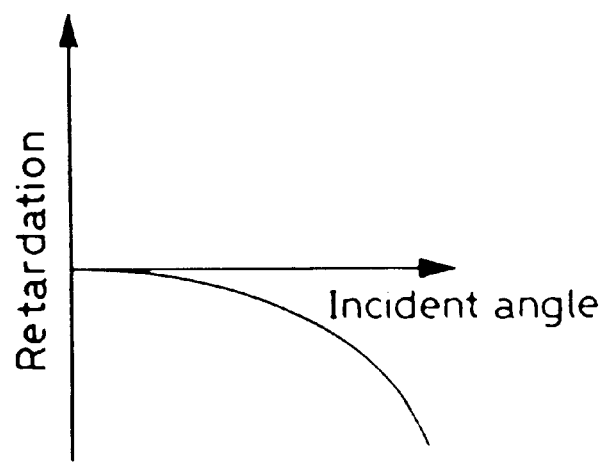
FIG. 11 is a diagram showing retardation produced by a coating to cancel the retardation shown in FIG. 10.
Figure 12:
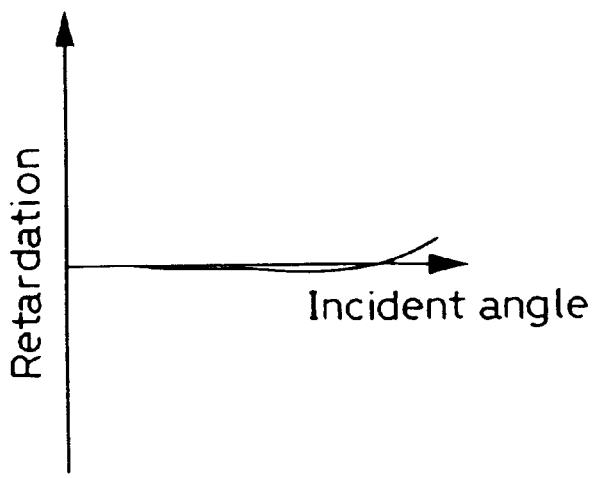
FIG. 12 is a diagram showing an example of retardation compensated by the present invention.

According to the present invention, a coating having characteristics as shown in FIG. 11 is provided on only the lens surface 16, for example, among the coated lens surfaces 16 to 21 of the objective. Consequently, retardation produced by the coating on the lens surface 16 cancels the retardation introduced by the lens surfaces 17 to 21. Thus, the retardation in the rays after passing through the objective can be reduced to a small amount as shown in FIG. 12.

Figure 2:
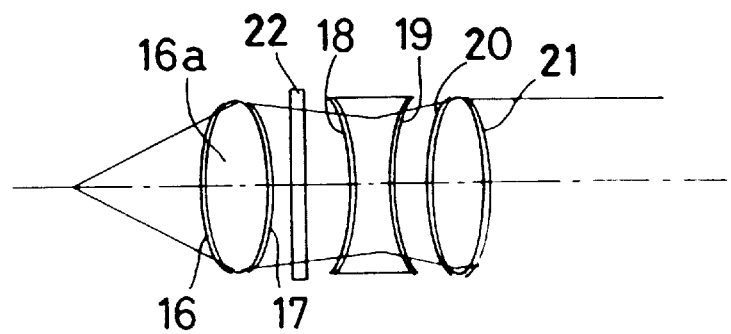
FIG. 2 is a sectional view showing an example in which retardation is compensated by placing a λ/2 wave plate in the objective shown in FIG. 1.
Figure 13:
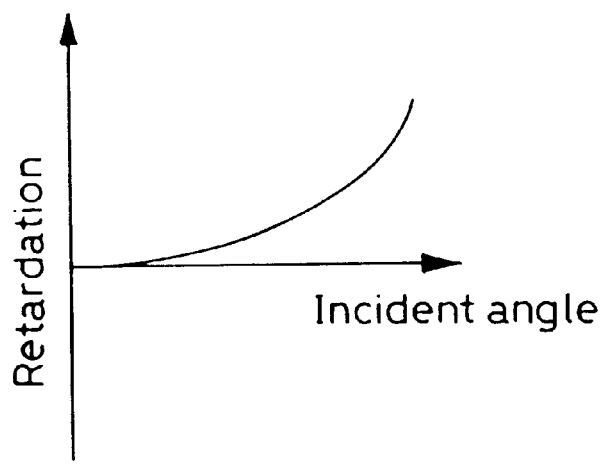
FIG. 13 is a diagram showing retardation introduced by a plurality of lens surfaces constituting a part of the objective shown in FIG. 2.
Figure 14:
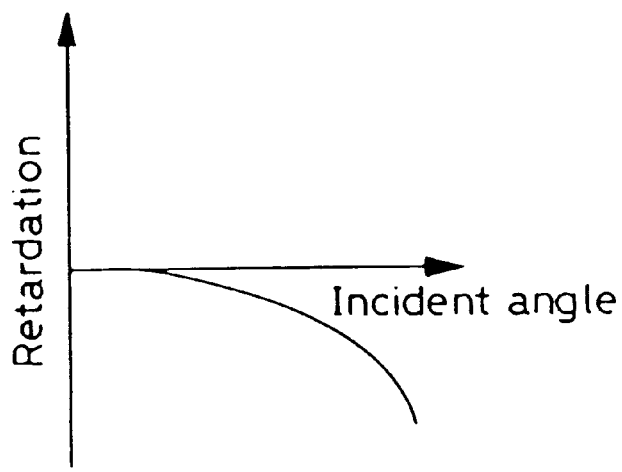
FIG. 14 is a diagram showing retardation after passage through the λ/2 wave plate in the objective shown in FIG. 2.

The above-described polarization compensating optical system may be used in combination with a λ/2 wave plate (half-wave plate). As shown for example in FIG. 2, a λ/2 wave plate 22 is placed between a lens 16a and the lens surfaces 18 to 21. In a case where the lens surfaces 18 to 21 introduce retardation as shown in FIG. 13, the lens surfaces 16 and 17 may be coated so that the lens 16a provides retardation approximately similar to that shown in FIG. 13. The retardation in the rays after passing through the λ/2 wave plate 22 is such as that shown in FIG. 14. Accordingly, this retardation substantially cancels the retardation introduced by the lens surfaces 18 to 21.

Thus, according to the present invention, coatings provided on lens surfaces can be appropriately combined so that retardation in rays after passing through an optical system to be compensated becomes approximately zero. Accordingly, the effect of retardation compensation can also be obtained by providing an existing coating on an optimal lens surface without designing a new coating.

Figure 3:
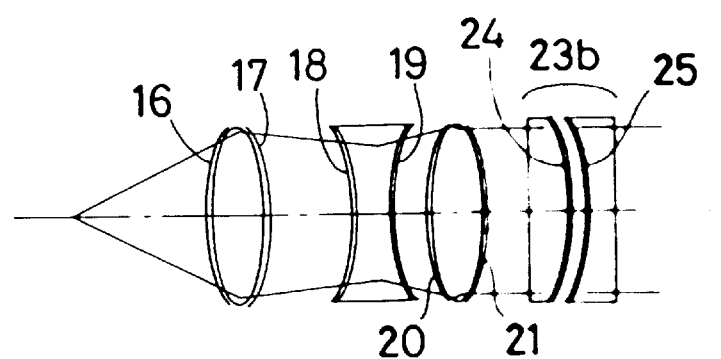
FIG. 3 is a sectional view showing an example in which the refracting power of the polarization compensating optical system according to the present invention is set approximately zero.
Figure 4:
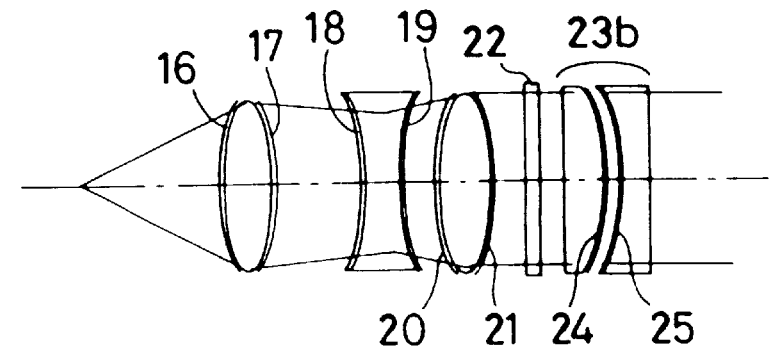
FIG. 4 is a sectional view showing an example in which a λ/2 wave plate is used in the arrangement shown in FIG. 3.

The polarization compensating optical system may be arranged such that its refracting power is approximately zero. For example, a polarization compensating optical system as denoted by reference character 23b in FIG. 3 may be added to an objective which introduces a large amount of retardation. In this case, the polarization compensating optical system 23b is composed of two lenses. The mutually opposing lens surfaces 24 and 25 of the lenses have an approximately equal radius of curvature. The other surfaces of the two lenses are plane surfaces or have the same radius of curvature. Either or both of the mutually opposing lens surfaces 24 and 25 are coated, and an appropriate radius of curvature is given to these surfaces. By doing so, it is possible to cancel the retardation produced by the lens surfaces 16 to 21. In this case, as shown in FIG. 4, a λ/2 wave plate 22 may be inserted in between the lens surfaces 16 to 21 and the polarization compensating optical system 23b. The use of a polarization compensating optical system whose refracting power is approximately zero makes it possible to compensate for retardation without the need of changing the coating used in the existing objective.

As will be stated more specifically later in the description of Examples, the amount of rotation of the polarization plane is generally smaller in the case of a coated lens surface than in the case of an uncoated lens surface. Accordingly, when a coated surface is used to compensate for retardation, the surface has a smaller effect on the rotation of the polarization plane than an uncoated surface. On the other hand, in the case of an uncoated surface, the amount of rotation of the polarization plane is large. Therefore, it is possible to increase the amount of compensation for the rotation of the polarization plane. For this reason, it is considered appropriate not to coat a refracting surface used to compensate for the rotation of the polarization plane. Accordingly, it is most desirable that among the disorders of the polarization plane occurring in the optical system to be compensated, rotation of the polarization plane and retardation should be compensated independently of each other by using an uncoated refracting surface and a coated refracting surface, respectively. In other words, it is preferable to use two optical systems having respective functions independent of each other. A first optical system as one of the two optical systems has an uncoated refracting surface that produces an absolute quantity of rotation approximately equal to the amount of rotation of the polarization plane produced in the optical system to be compensated. A second optical system as the other of the two optical systems has a coated refracting surface that produces an absolute quantity of retardation approximately equal to the amount of retardation produced in the optical system to be compensated. With the two optical systems, the disorders in the state of polarization in the optical system concerned can be compensated with high accuracy.

Figure 5:
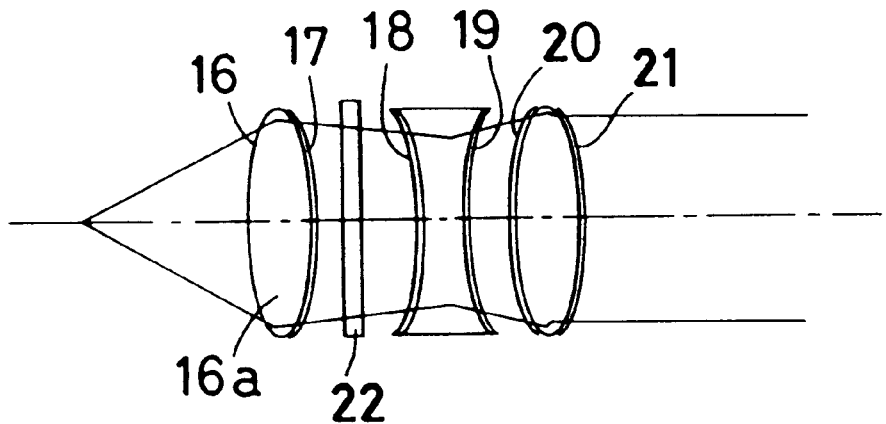
FIG. 5 is a sectional view showing an objective compensated for both rotation of the polarization plane and retardation.

FIG. 5 shows an example of an objective compensated for both rotation of the polarization plane and retardation. Rotation of the polarization plane is compensated by placing a λ/2 wave plate 22 behind the lens 16a, leaving the lens surface 16 uncoated. By doing so, the rotation of the polarization plane produced by the lens surfaces 16 and 17 cancels the rotation of the polarization plane by the lens surfaces 18 to 21. Retardation is compensated by providing the lens surface 19 with a coating selected to cancel retardation introduced by the lens surfaces 16 to 18 and 20 to 21.

The refracting power of the above-described first optical system may be set approximately zero. This enables additive compensation for rotation of the polarization plane in the existing optical system. The refracting power of the second optical system may also be set approximately zero. This enables compensation for retardation in the existing optical system simply by adding the second optical system without changing the coating of the existing optical system.

Figure 6:
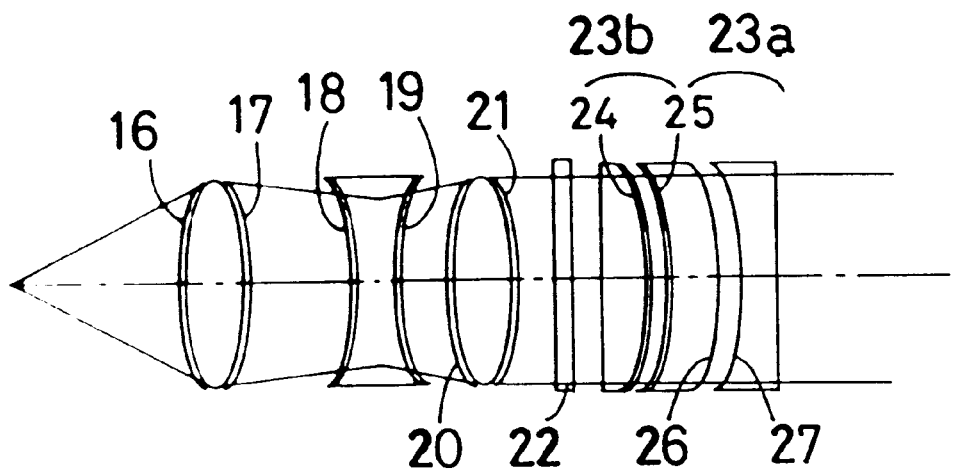
FIG. 6 is a sectional view showing an example in which the refracting power of each of the first and second optical systems according to the present invention is set approximately zero.

The refracting powers of both the first and second optical systems may be set approximately zero. FIG. 6 shows an example of this arrangement. As shown in FIG. 6, a first optical system 23a having lens surfaces 26 and 27 and a second optical system 23b having lens surfaces 24 and 25 are added to the existing objective having lens surfaces 16 to 21. This enables compensation for the disordered polarization state without changing the coating of the objective.

Figure 7:
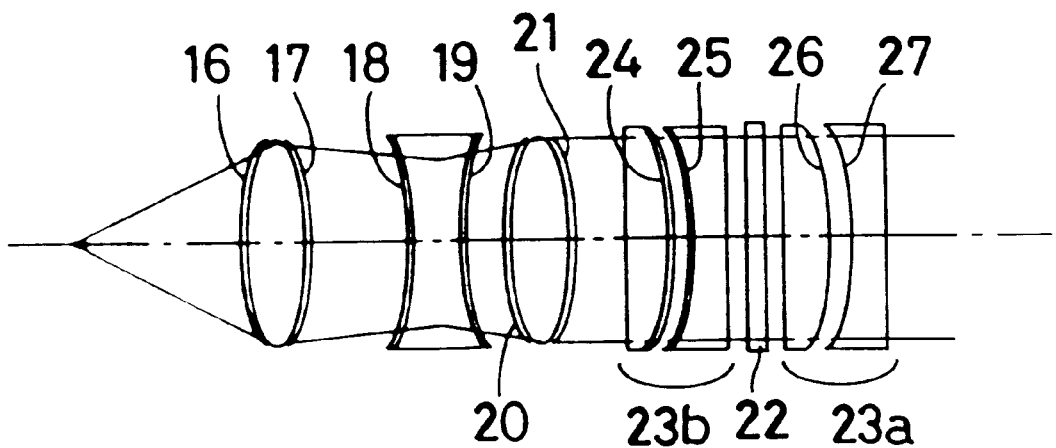
FIG. 7 is a sectional view showing another example in which the refracting power of each of the first and second optical systems according to the present invention is set approximately zero.
Figure 8:
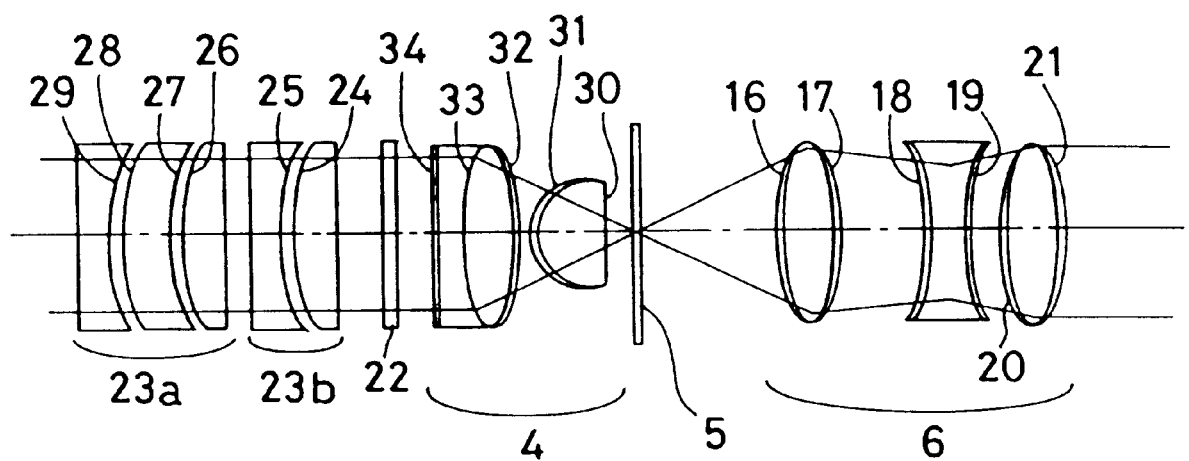
FIG. 8 is a diagram showing an example in which polarization compensation for the entire optical system of a microscope optical system, including an illumination optical system and an image-forming optical system, is performed in the illumination optical system.

The λ/2 wave plate 22 may be placed between the optical system, exclusive of the polarization compensating optical system, and the first optical system 23a. When the retardation produced by the second optical system 23b is opposite in sign to the retardation produced by the optical system, exclusive of the polarization compensating optical system, the second optical system 23b is placed on a side of the λ/2 wave plate 22 remote from the first optical system 23a. When the two retardations are equal in sign to each other, the second optical system 23b is placed on the same side of the λ/2 wave plate 22 as the first optical system 23a. In other words, when the retardation produced by the second optical system 23b can cancel the retardation introduced by the optical system to be compensated without passing through the λ/2 wave plate 22, the second optical system 23b is placed on a side of the λ/2 wave plate 22 remote from the first optical system 23a, as shown in FIG. 7. When the retardation produced by the second optical system 23b is equal in sign and approximately equal in amount to the retardation introduced by the optical system to be compensated, the second optical system 23b is placed on the same side of the λ/2 wave plate 22 as the first optical system 23a, as shown in FIG. 6.

The coating of the polarization compensating optical system may be a single-layer coating having a refractive index $n_1$. Assuming, that $n_0$ and $n_2$ are the refractive indices of the media on the two opposite sides of the single-layer coating, the coating may be arranged such that the following condition is satisfied:

$$n_0 < n_1 > n_2 \text{ or } n_0 > n_1 < n_2 \qquad (1)$$

Figure 15:
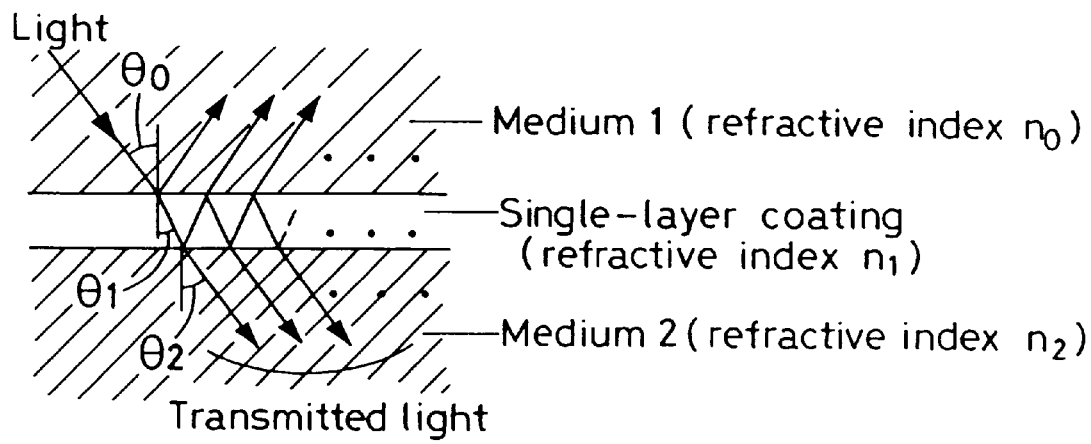
FIG. 15 is a diagram showing the arrangement of a single-layer coating and transmission of light.

The coating thus arranged is capable of canceling retardation generally introduced by conventional single-layer coatings and various multilayer coatings. The operation performed with the above-described arrangement will be described below. As shown in FIG. 15, let us consider a case where light passing through a medium 1 of refractive index $n_0$ enters a medium 2 of refractive index $n_2$. The medium 2 is provided with a single-layer coating of refractive index $n_1$. Considering the multiple interference in the single-layer coating, transmittance T from the medium 1 to the medium 2 is given by $$T = t_1 t_2 \exp(-i\delta)/\{1 + r_1 r_2 \exp(-2i\delta)\} \qquad (2)$$

where $t_1$ and $r_1$ represent respectively the Fresnel transmittance and Fresnel reflectivity at the boundary surface between the medium 1 and the single-layer coating, and $t_2$ and $r_2$ represent respectively the Fresnel transmittance and Fresnel reflectivity at the boundary surface between the single-layer coating and the medium 2. In the expression, δ satisfies the following condition:

$$2\delta = 4\pi n_1 d \cos \theta_1 / \lambda \qquad (3)$$

where $\lambda$ is the wavelength of light; d is the thickness of the single-layer coating; and $\theta_1$ is the refraction angle of light from the medium 1 to the single-layer coating (or the incident angle of light from the single-layer coating to the medium 2).

Expression (2) may be changed as follows:

$$T = t_1 t_2 \exp[i \tan^{-1}\{(r_1 r_2 - 1)\tan \delta/(r_1 r_2 + 1)\}]$$
$$\div [\{(1 + r_1 r_2)\cos \delta\}^2 + \{(1 - r_1 r_2)\sin \delta\}^2]^{1/2} \quad (4)$$

From the above expression, the phase portion of T is given by $$\tan^{-1}\{(r_1 r_2 - 1)\tan \delta/(r_1 r_2 + 1)\} \quad (5)$$

Accordingly, retardation between p-polarized light and s-polarized light is expressed as the difference between expression (5) with respect to p-polarized light and that with respect to s-polarized light. It should be noted that the sign of retardation can be defined as desired; however, in the following description, retardation is defined by (phase of p-polarized light)−(phase of s-polarized light)

In expression (5), tan δ is known from expression (3) to be the same positive value for p- and s-polarized light, and $\tan^{-1}$ is a monotone increasing function. Therefore, the sign of retardation is coincident with the sign of $R_s$ in the following expression:

$$R_s = (r_{1p} r_{2p} - 1)/(r_{1p} r_{2p} + 1)$$
$$- (r_{1s} r_{2s} - 1)/(r_{1s} r_{2s} + 1) \quad (6)$$

Here, $r_{1p}$, $r_{1s}$, and $r_{2s}$ are given as follows:

$$r_{1p} = (n_0 \cos \theta_1 - n_1 \cos \theta_0)$$
$$\div (n_0 \cos \theta_1 + n_1 \cos \theta_0)$$
$$r_{1s} = (n_0 \cos \theta_0 - n_1 \cos \theta_1)$$
$$\div (n_0 \cos \theta_0 + n_1 \cos \theta_1)$$
$$r_{2p} = (n_1 \cos \theta_2 - n_2 \cos \theta_1)$$
$$\div (n_1 \cos \theta_2 + n_2 \cos \theta_1)$$
$$r_{2s} = (n_1 \cos \theta_1 - n_2 \cos \theta_2)$$
$$\div (n_1 \cos \theta_1 + n_2 \cos \theta_2) \quad (7)$$

At this time, expression (6) may be changed as follows:

$$R_s = \{n_2(n_1^2 - n_0^2)\cos \theta_0 (\cos^2 \theta_1 - \cos^2 \theta_2)$$
$$+ n_0(n_1^2 - n_2^2)\cos \theta_2(\cos^2 \theta_1 - \cos^2 \theta_0)\}$$
$$\div \{n_1 \cos \theta_1(n_0 \cos \theta_2 + n_2 \cos \theta_0)$$
$$\times (n_0 \cos \theta_0 + n_2 \cos \theta_2)\} \quad (8)$$

Here, the Snell law is used, which is given by $$n_0 \sin \theta_0 = n_1 \sin \theta_1, \; n_1 \sin \theta_1 = n_2 \sin \theta_2 \quad (9)$$

Consequently, the numerator (numerator of $R_s$) of expression (8) may be changed as follows:

$$\{(n_2 \cos \theta_0 \sin^2 \theta_2 + n_0 \cos \theta_2 \sin^2 \theta_0)/n_1^2\}$$
$$\times (n_1 + n_0)(n_1 - n_0)(n_1 + n_2)(n_1 - n_2) \quad (10)$$

It will be understood that the sign of $R_s$ is determined by the sign of $(n_1 - n_0)(n_1 - n_2)$ because the denominator of expression (8) and portions of expression (10) other than $(n_1 - n_0)(n_1 - n_2)$ are all positive values.

Accordingly, when $$n_0 < n_1 > n_2 \text{ or } n_0 > n_1 < n_2 \quad (11)$$

$$R_s > 0$$

When $$n_0 < n_1 < n_2 \text{ or } n_0 > n_1 > n_2 \quad (12)$$

$$R_s < 0$$

It is a general rule that the refractive index of an antireflection single-layer coating provided on an air contact surface of a lens or prism is set lower than the refractive index of a medium, e.g. glass, which forms the lens or prism. Accordingly, the single-layer coating satisfies the condition (12), and the retardation between p- and s-polarized light is negative. In an optical system that uses a large number of lenses provided with such an antireflection coating, negative retardations are accumulated. In contrast, the arrangement according to the present invention uses a coating that satisfies the condition (11). Therefore, retardation produced by the coating has a positive value. Accordingly, the use of the polarization compensating optical system according to the present invention in the optical system makes it possible to cancel the negative retardation produced by the optical system. The arrangement according to the present invention is also effective for an optical system using a multilayer coating that introduces a negative retardation.

A refracting surface provided with the above-described coating may be formed as a contact surface of an immersion lens that is placed in contact with a liquid. That is, the contact surface of the immersion lens is provided with a single-layer coating having a refractive index higher or lower than both the refractive indices of the immersion lens and liquid. By doing so, a positive retardation can be produced, and thus a negative retardation in the optical system can be canceled.

A refracting surface provided with the above-described coating may be formed as a cemented surface of an optical member such as a lens or a prism. A positive retardation can be produced by using a single-layer coating having a refractive index higher or lower than both the refractive indices of the optical member and cementing material. Thus, a negative retardation in the optical system can be canceled.

It is desirable that at least one of the following conditions should be satisfied for the above-described refractive indices $n_0$, $n_1$ and $n_2$.

$$|n_1 - n_0| \geq 0.15 \text{ or } |n_1 - n_2| \geq 0.15 \quad (13)$$

The larger the refractive index difference between the single-layer coating and a medium adjacent to it, the larger retardation the coating provides. Accordingly, a larger amount of compensation can be obtained by satisfying the condition (13). It is more desirable to satisfy the following condition:

$$|n_1 - n_0| \geq 0.25 \text{ or } |n_1 - n_2| \geq 0.25$$

By satisfying the above condition, an even larger amount of compensation for retardation can be obtained.

In a case where a refracting surface provided with the above-described coating is a contact surface that is in contact with air, it is desirable to satisfy the following condition:

$$n_1 \geq 1.6 \quad (14)$$

At this time, if the medium contacting the refracting surface on a side thereof remote from air has a refractive index less than 1.6, the condition (11) is satisfied, and the condition (13) is also satisfied. Accordingly, the negative retardation in the optical system can be canceled even more efficiently. In a case where it is desirable to obtain a larger amount of compensation for retardation even when the medium contacting the refracting surface on a side thereof remote from air has a refractive index less than 1.6, or when the refractive index of the medium of a lens or the like to be coated is not smaller than 1.6 but less than 1.9, it is desirable to satisfy the following condition:

$n_1 \geq 1.9$

Examples of the optical system having a polarization compensating optical system according to the present invention will be described with reference to the accompanying drawings.

EXAMPLE 1

Figure 16:
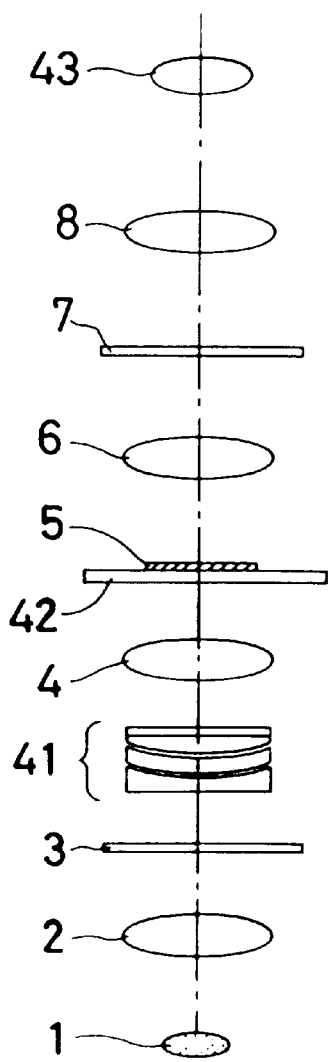
FIG. 16 is a diagram showing a polarizing microscope using a condenser according to Example 1 of the present invention.
Figure 30:
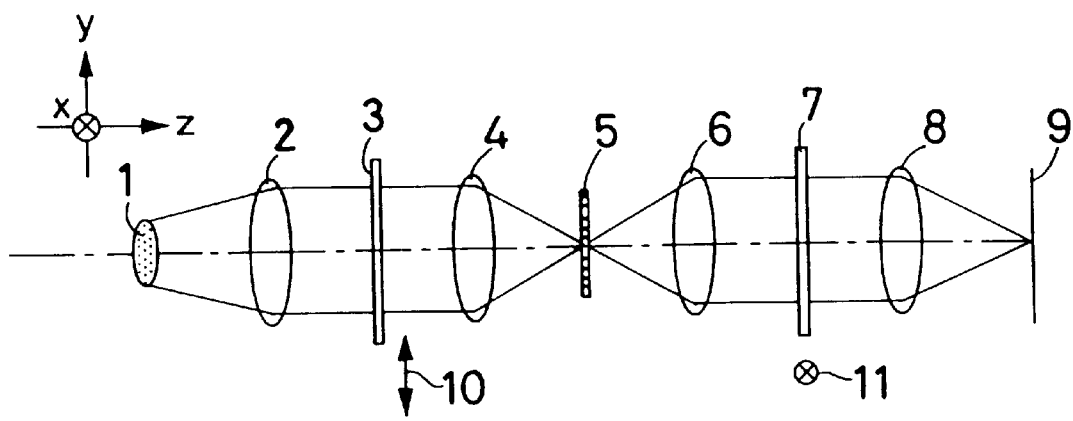
FIG. 30 is a diagram schematically showing an optical system of a polarizing microscope.
Figure 31:
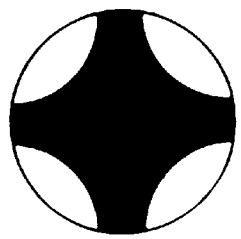
FIG. 31 is a diagram showing an example of isogyre observed through the polarizing microscope when the polarizer and analyzer are arranged in crossed Nicol relation to each other.
Figure 32:
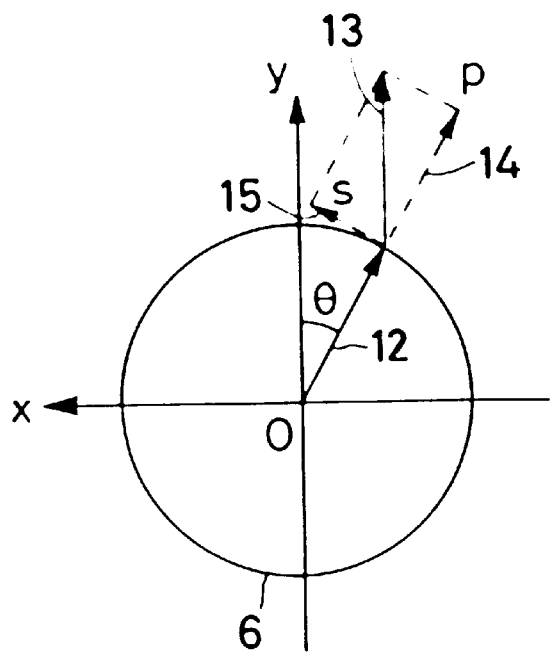
FIG. 32 is a diagram showing the direction of a ray incident on an objective in FIG. 30 and also showing p- and s-polarized light components of the ray.

In this example, polarization compensation is performed for a condenser 4 of a polarizing microscope as shown in FIG. 16. The same arrangements as those of the polarizing microscope shown in FIG. 30 are denoted by the same reference numerals, and a description of the functions and operations thereof is omitted. In FIG. 16, a part of the polarizing microscope including elements from a light source 1 to a condenser 4 is an illumination optical system. Reference numeral 42 denotes a stage for supporting a specimen 5. An image of the specimen 5 is formed by an objective 6 and an image-forming lens 8 and observed through an ocular 43. Although a polarization compensating optical system 41 is provided in the illumination optical system of FIG. 16, it is not necessary because the condenser 4 in this example performs polarization compensation. As a specific example of the condenser 4, an oil immersion condenser having a numerical aperture (NA) of 1.3, as shown in the sectional view of FIG. 17, will be explained. Lens data concerning the condenser is shown in Table 1 (shown later). In a case where a single-layer coating (material: MgF$_2$; the refractive index for the spectral d-line: 1.38; and the optical thickness: 190 nanometers) is simply provided as an antireflection coating on both surfaces of each of lenses L1 to L3 which form the condenser, i.e. on each of the surface Nos. 1, 3, 4, 5, 6 and 8 in Table 1, the amount of retardation between p- and s-polarized light is shown by curve A in FIG. 18 with respect to the aperture ratio of parallel rays entering the condenser. It will be understood that a large retardation is produced at a high aperture ratio. For a ray having an aperture ratio of 0.9, the lens surfaces of the condenser shown in FIG. 17 produce retardations as shown in Table 2 below. It should be noted that in this example a single-layer coating that satisfies the condition (11) is provided on the surface No. 8, which is an oil contact surface, simply for the purpose of facilitating the explanation, but not with the intention of producing a polarization compensating effect.

TABLE 2

| Lens | Surface No. | Retardation | |
|---|---|---|---|
| L1 | 1 | −0.028 | −0.132 |
|  | 3 | −0.104 |  |
| L2 | 4 | −0.572 | −0.585 |
|  | 5 | −0.013 |  |

TABLE 2-continued

| Lens | Surface No. | Retardation | |
|---|---|---|---|
| L3 | 6 | −0.438 | +1.539 |
|  | 8 | +1.977 |  |
| Total |  |  | +0.822 |

Here, an antireflection coating as specified below is provided on only the two surfaces of the lens L2, i.e. the surface Nos. 4 and 5, by using the technique according to the present invention.

TABLE 3

| First layer (counted from the glass substrate) | $n_d$ = 1.5 | d = 202.5 |
|---|---|---|
| Second layer | $n_d$ = 1.6 | d = 192.0 |
| Third layer | $n_d$ = 2.0 | d = 500.0 |
| Fourth layer | $n_d$ = 1.38 | d = 172.5 |

In the above table, $n_d$ represent the refractive index for the spectral d-line, and d the optical thickness (nanometers). Retardation introduced by each lens surface in a ray having an aperture ratio of 0.9 among parallel rays entering the condenser is calculated. The result is shown in Table 4 below.

TABLE 4

| Lens | Surface No. | Retardation | |
|---|---|---|---|
| L1 | 1 | −0.028 | −0.132 |
|  | 3 | −0.104 |  |
| L2 | 4 | −1.391 | −1.448 |
|  | 5 | −0.057 |  |
| L3 | 6 | −0.438 | +1.539 |
|  | 8 | +1.977 |  |
| Total |  |  | −0.041 |

Thus, by appropriately changing the coating, the retardation introduced by the lenses L1 and L3 is canceled with the retardation produced by the lens L2. Consequently, the total retardation introduced in a ray having an aperture ratio of 0.9 can be reduced to approximately zero. The retardation between p- and s-polarized light is shown by curve B in FIG. 18 with respect to the aperture ratio. The retardation before the change of the coating, which is about 1.8 degrees at maximum, can be reduced within a range of from −0.3 degree to 0.4 degree by the coating of the surface Nos. 4 and 5.

Thus, it will be understood that the retardation produced by the coating on the two surfaces (surface Nos. 4 and 5) of the lens L2 cancels the retardation produced in the entire condenser, thereby compensating the polarization performance for undesired retardation.

EXAMPLE 2

Figure 19:
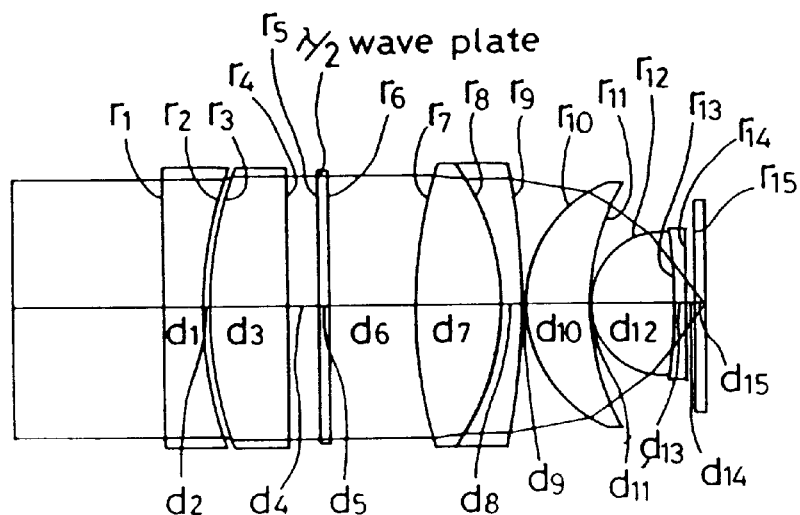
FIG. 19 is a sectional view of an optical system according to Example 2 of the present invention in which a rectifier is added to a condenser.

Next, let us consider improving the polarization performance, including retardation and rotation of the polarization plane. The optical system to be compensated in this example is the same condenser as in Example 1. A conventional rectifier can be used to compensate for rotation of the polarization plane. A rectifier compensating for rotation of the polarization plane is added in front of the condenser of FIG. 17, in which a single-layer coating (material: MgF$_2$; the refractive index for the spectral d-line: 1.38; and the optical thickness: 190 nanometers) is provided on all lens surfaces. Lens data concerning this arrangement is shown in Table 5 (shown later). The lens system is shown in the sectional view of FIG. 19.

Figure 17:
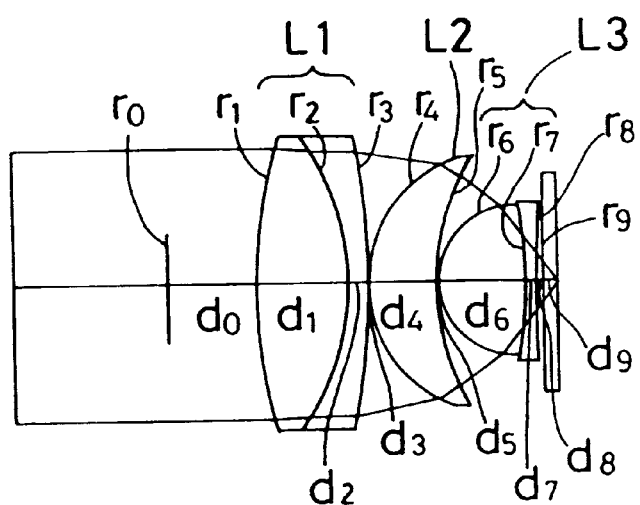
FIG. 17 is a sectional view of the condenser according to Example 1 of the present invention.
Figure 18:
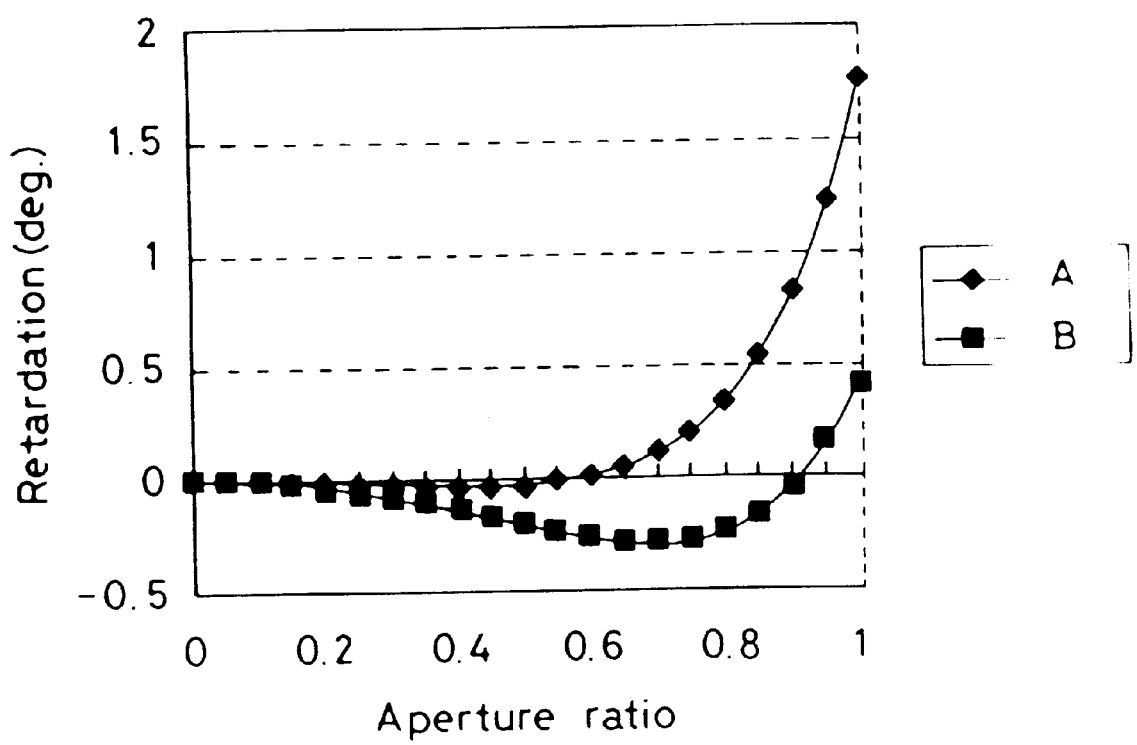
FIG. 18 is a diagram showing retardation with respect to the optical system shown in FIG. 17.
Figure 20:
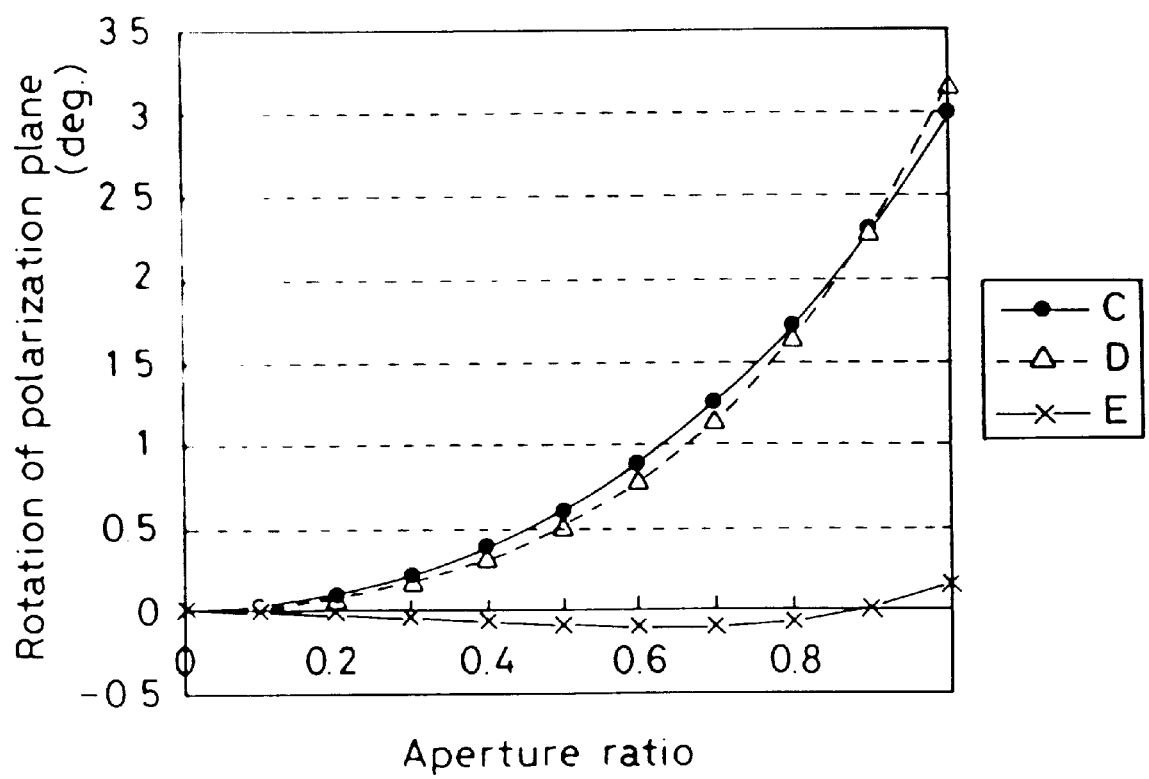
FIG. 20 is a diagram showing rotation of the polarization plane with respect to the optical system shown in FIG. 19.

In the data shown in Table 5, the surface Nos. 1 to 4 form a rectifier that compensates for rotation of the polarization plane. No coating is provided on the refracting surfaces (surface Nos. 2 and 3) of the rectifier. The direction of the neutral axis of the λ/2 wave plate is coincident with the direction of the y-axis in FIG. 30. In the above-described arrangement, the rotational angle of the polarization plane of a ray having an aperture ratio of 0.9 and an azimuth angle of 45 degrees is examined. The amount of rotation of the polarization plane introduced by the lens system (surface Nos. 1 to 4) of the rectifier is shown by curve C in the graph of FIG. 20 with respect to the aperture ratio. The amount of rotation of the polarization plane introduced by the condenser lens system (surface Nos. 7 to 15) is shown by curve D in the graph of FIG. 20 with respect to the aperture ratio. The amount of rotation (C) of the polarization plane introduced by the rectifier lens system is approximately equal to the amount of rotation (D) of the polarization plane introduced by the condenser lens system over the aperture ratio range of from 0 to 1.0. The sign of rotation of the polarization plane in the rectifier lens system is inverted by the λ/2 wave plate. Therefore, the rotation of the polarization plane in the rectifier lens system cancels the rotation of the polarization plane in the condenser lens system. Consequently, the amount of rotation of the polarization plane in rays after passage through the entire lens system (surface Nos. 1 to 15) is approximately zero over the entire aperture ratio range, as shown by curve E in the graph of FIG. 20. Accordingly, the EF value calculated over the entire aperture is about 2,600 in the condenser alone, which is shown in FIG. 17, whereas the EF value is about 66,000 in the condenser with the rectifier added thereto. Thus, the EF value is improved by about 25 times. The term "EF value" is defined as follows: A polarizer is placed in front of the above-described condenser, and an objective and an analyzer are placed behind the condenser, as in the case of the arrangement shown in FIG. 30. Assuming that there is no effect of the objective on the polarization performance, the ratio of transmissivity in a parallel Nicol arrangement where the vibration axes of the polarizer and analyzer are parallel to each other to that in a crossed Nicol arrangement where the vibration axes of the polarizer and analyzer are perpendicular to each other is calculated over the entire aperture. The transmissivity ratio thus calculated is defined as EF value.

In the above case, compensation for rotation of the polarization plane is accomplished, but retardation still remains uneliminated. It is considered possible to realize an even higher EF value by eliminating retardation. Retardation can be eliminated by providing the refracting surfaces (surface Nos. 2 and 3) of the rectifier with a coating providing retardation that cancels the retardation introduced by the condenser. It is considered that, by doing so, both "rotation of the polarization plane" and "retardation" can be eliminated at the same time with a single rectifier. However, a conventional antireflection coating such as that provided on ordinary lens surfaces is designed to raise the transmittance as high as possible. Therefore, a transmittance difference between p- and s-polarized light is unlikely to occur in such a conventional antireflection coating. For this reason, the coated rectifier is not very effective in canceling the rotation of the polarization plane although it can eliminate retardation.

Figure 21:
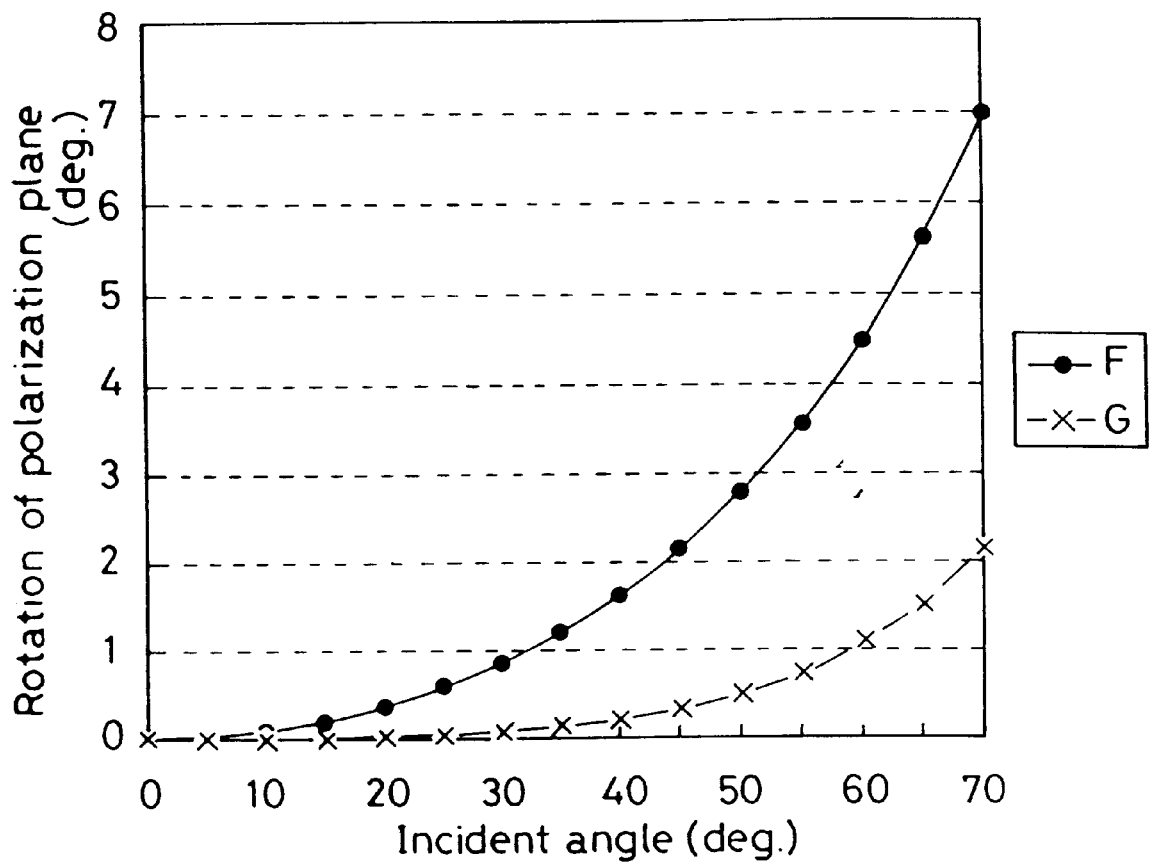
FIG. 21 is a diagram showing a comparison as to the amount of rotation of the polarization plane between a coated glass surface and an uncoated glass surface.

For example, let us example the angle of rotation of the polarization plane with respect to the incident angle when linearly polarized light in which the proportions of p- and s-polarized light are equal to each other is incident on the same glass (refractive index for the spectral d-line: 1.80518; and Abbe's number for the spectral d-line: 25.4) as used in the above-described rectifier. The angle of rotation of the polarization plane is shown by curve F in the graph of FIG. 21. When the surface of the glass is provided with an antireflection single-layer coating (material: $MgF_2$; the refractive index for the spectral d-line: 1.38; and the optical thickness: 190 nanometers), the angle of rotation of the polarization plane reduces as shown by curve G in FIG. 21. Thus, provision of the antireflection coating on glass causes the amount of rotation of the polarization plane to become smaller than in the case of uncoated glass. More specifically, in this example, an incident angle of rays needed to rotate the polarization plane through 1 degree is about 32 degrees in the case of uncoated glass and about 60 degrees in the case of coated glass. Accordingly, in order to rotate the polarization plane by a coated rectifier, it is necessary to use a rectifier having a very small radius of curvature in comparison to an uncoated rectifier. A refracting surface having a very small radius of curvature is likely to produce aberrations. Consequently, the original optical performance of the optical system (the condenser in this case) to be compensated is impaired. In the case of a rectifier having a very small radius of curvature, rays in the periphery of the lens may be totally reflected in the lens. Therefore, it is preferable to use an uncoated rectifier for compensating for rotation of the polarization plane. It is not desirable to coat the rectifier to cancel retardation at the same time.

Accordingly, compensation for rotation of the polarization plane is performed by the above-described rectifier without coating, and compensation for retardation is accomplished by another refracting surface provided with a coating. As shown in Tables 6 and higher (shown later), an uncoated rectifier is placed in front of the condenser shown in FIG. 17. In this lens arrangement, the coating on the surface Nos. 10 and 11 is changed to the coating shown in Table 3, as in the case of Example 1, and the single-layer coating on the surface Nos. 7, 9, 12 and 14 is left as it is. In this case, the EF value over the entire aperture is about 389,000. Thus, the EF value is improved to a level about 150 times higher than in an arrangement in which no rectifier is provided and the coating is not changed, and it is improved to a level about 6 times higher than the EF value in an arrangement in which only the rotation of the polarization plane is compensated by the rectifier.

EXAMPLE 3

Figure 22:
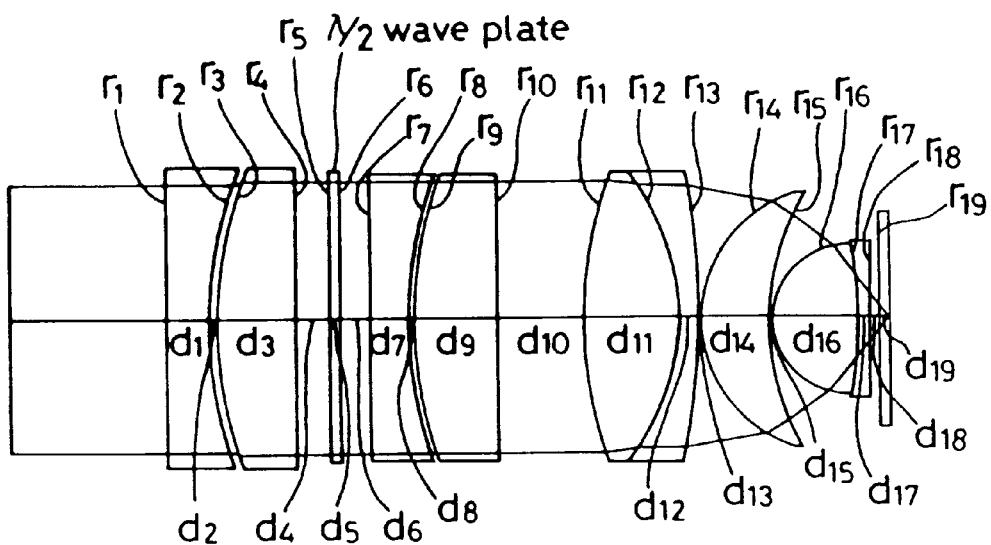
FIG. 22 is a sectional view of an optical system according to Example 3 of the present invention in which a condenser is combined with a retardation compensating optical system and a polarization plane rotation compensating optical system.

In Examples 1 and 2, retardation is eliminated by changing the coating on the lens surfaces in the optical system to be compensated. When it is difficult to change the coating on the lens surfaces or it is desired to perform polarization compensation for an existing optical system, it is desirable to add an optical system for retardation compensation to the optical system to be compensated. FIG. 22 shows an example in which a combination of retardation compensating optical system and a polarization plane rotation compensating optical system is added to the condenser (FIG. 17), which is an optical system to be compensated in Examples 1 and 2. Lens data concerning the example is shown in Table 7 (shown later).

The direction of the neutral axis of the λ/2 wave plate and so forth are the same as those in Example 2. The surface Nos. 1 to 4 form an optical system that compensates for rotation of the polarization plane. The surface Nos. 7 to 10 form an optical system that compensates for retardation. No coating is provided on the surface Nos. 2 and 3 as in the case of Example 2. Regarding the surface Nos. 8 and 9, an optimum radius of curvature, refractive index and coating can be selected to cancel retardation introduced by the condenser. The single-layer coating as used in Examples 1 and 2 is provided on the surface Nos. 11, 13, 14, 15, 16 and 18. An antireflection coating as specified below is provided on only two surfaces, i.e. the surface Nos. 8 and 9.

TABLE 8

| First layer (counted from the glass substrate) | $n_d = 1.6$ | $d = 384.0$ |
|---|---|---|
| Second layer | $n_d = 2.0$ | $d = 500.0$ |
| Third layer | $n_d = 1.38$ | $d = 172.5$ |

In the above-described lens arrangement, the EF value over the entire aperture is about 302,000. Thus, the EF value is improved to a level about 120 times higher than in the case of a condenser alone, without a polarization compensating optical system, and it is improved to a level about 4.6 times higher than the EF value in an arrangement in which only the rotation of the polarization plane is compensated by the rectifier.

EXAMPLE 4

Figure 23:
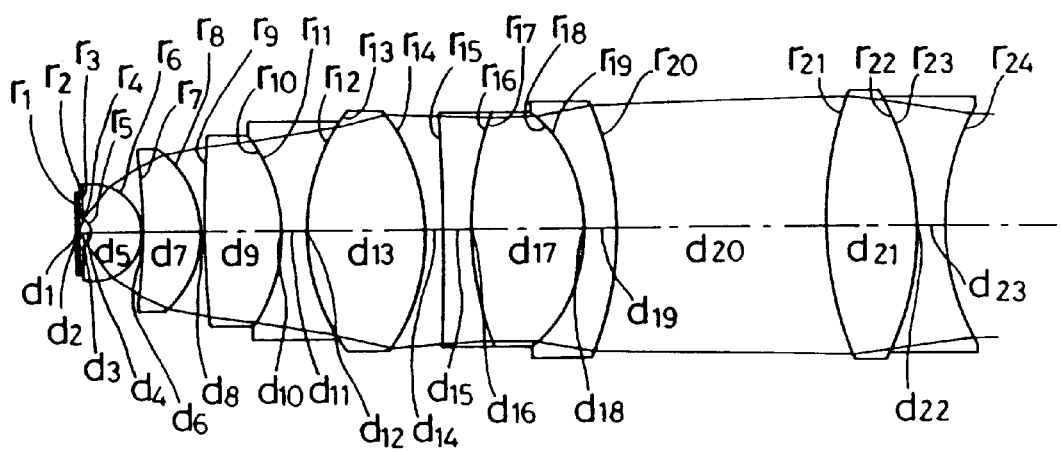
FIG. 23 is a sectional view of an objective according to Example 4 of the present invention.

In this example, polarization compensation is performed for the objective 6 in the polarizing microscope shown in FIG. 30. As a specific example, an oil immersion objective having a numerical aperture (NA) of 1.3, as shown in the sectional view of FIG. 23, will be explained. Lens data concerning the objective is shown in Table 8 (shown later). Only in this example, the lens data includes data concerning a cementing material used between lenses. In general, an antireflection coating is provided on the air contact surface of the objective. Let us assume a case where a single-layer coating (material: MgF$_2$; the refractive index for the spectral d-line: 1.38; and the optical thickness: 190 nanometers) is simply provided on the surface Nos. 6 to 9, 14 to 15, 20 to 21 and 24. In this arrangement, retardation introduced by each lens surface in a ray having an aperture ratio of 1.0 is calculated. Retardations thus calculated are shown in Table 9 below.

TABLE 9

| Surface No. | Retardation (degrees) | Cumulative Total (degrees) |
|---|---|---|
| 1 | 0 | 0 |
| 2 | 0 | 0 |
| 3 | 0 | 0 |
| 4 | 0 | 0 |
| 5 | 0 | 0 |
| 6 | −0.924 | −0.924 |
| 7 | −0.094 | −1.018 |
| 8 | −0.274 | −1.292 |
| 9 | −0.006 | −1.298 |
| 10 | 0 | −1.298 |
| 11 | 0 | −1.298 |
| 12 | 0 | −1.298 |
| 13 | 0 | −1.298 |
| 14 | −0.38 | −1.678 |
| 15 | −0.005 | −1.683 |
| 16 | 0 | −1.683 |
| 17 | 0 | −1.683 |
| 18 | 0 | −1.683 |
| 19 | 0 | −1.683 |

TABLE 9-continued

| Surface No. | Retardation (degrees) | Cumulative Total (degrees) |
|---|---|---|
| 20 | −0.089 | −1.772 |
| 21 | −0.076 | −1.848 |
| 22 | 0 | −1.848 |
| 23 | 0 | −1.848 |
| 24 | −0.075 | −1.923 |

Figure 24:
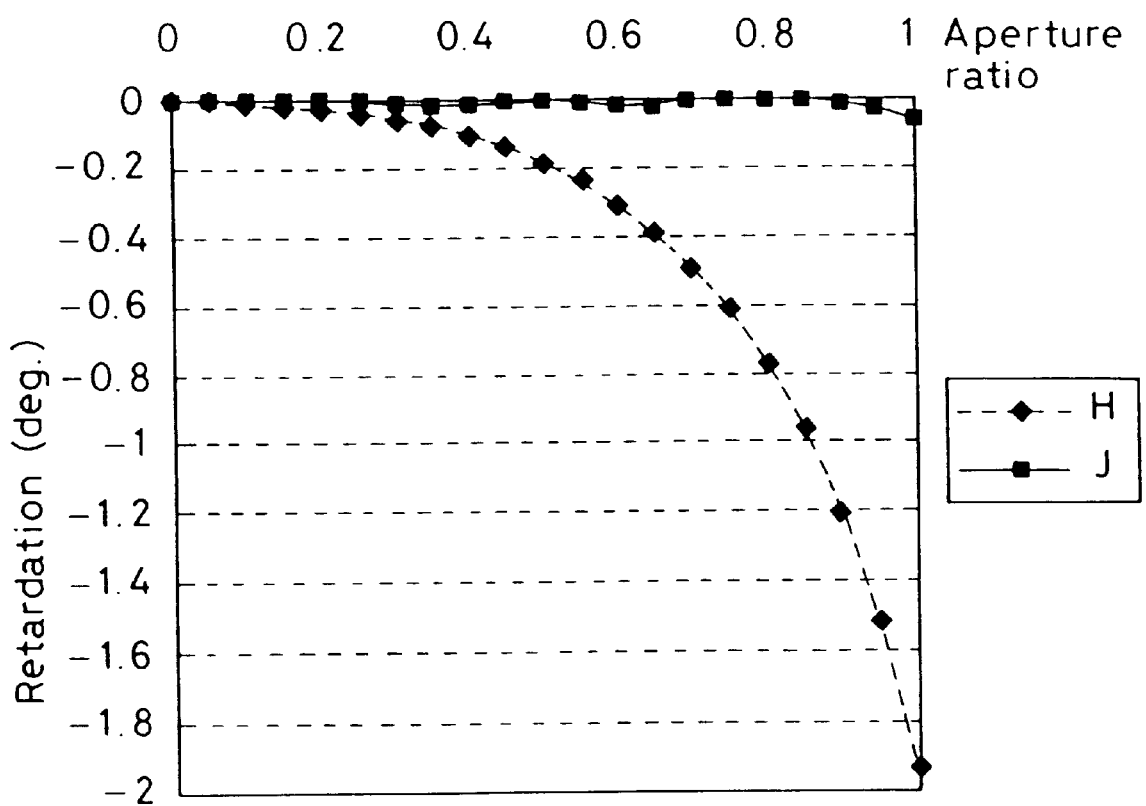
FIG. 24 is a diagram showing retardation with respect to the optical system shown in FIG. 23.

As will be understood from Table 9, the condition (12) is satisfied at the surfaces provided with the above-described coating. Therefore, the coated surfaces introduce negative retardations. After passage through the objective, retardation as high as about −2 degrees has been accumulated. Examination of retardation over the entire aperture ratio range after passage through the objective reveals that retardation increases as the aperture ratio becomes higher, as shown by curve H in the graph of FIG. 24.

Under these circumstances, the surface No. 19, which is a cemented surface, is provided with a single-layer coating (material: MgF$_2$; the refractive index for the spectral d-line: 1.38; and the optical thickness: 200 nanometers) according to the present invention. Further, the surface No. 20 is provided with a single-layer coating (material: ZrO$_2$; the refractive index for the spectral d-line: 2.03; and the optical thickness: 152 nanometers). At the single-layer coating (refractive index=1.38) on the surface No. 19, the refractive indices of the media on the front and back sides thereof are $n_{15}=1.56444$ and $n_{16}=1.67790$, respectively. Therefore, the conditions (11) and (13) are satisfied. The surface No. 20 is an air contact surface, and the refractive index of the single-layer coating is 2.03. Therefore, the conditions (13) and (14) are satisfied. The refractive index of the medium on the side remote from air is $n_{16}=1.67790$. Therefore, the condition (11) is satisfied. In this arrangement, retardation introduced by each lens surface in a ray having an aperture ratio of 1.0 is calculated. Retardations calculated are shown in Table 10 below.

TABLE 10

| Surface No. | Retardation (degrees) | Cumulative total (degrees) |
|---|---|---|
| 1 | 0 | 0 |
| 2 | 0 | 0 |
| 3 | 0 | 0 |
| 4 | 0 | 0 |
| 5 | 0 | 0 |
| 6 | −0.924 | −0.924 |
| 7 | −0.094 | −1.018 |
| 8 | −0.274 | −1.292 |
| 9 | −0.006 | −1.298 |
| 10 | 0 | −1.298 |
| 11 | 0 | −1.298 |
| 12 | 0 | −1.298 |
| 13 | 0 | −1.298 |
| 14 | −0.38 | −1.678 |
| 15 | −0.005 | −1.683 |
| 16 | 0 | −1.683 |
| 17 | 0 | −1.683 |
| 18 | 0 | −1.683 |
| 19 | +1.378 | −0.305 |
| 20 | +0.395 | +0.09 |
| 21 | −0.076 | +0.014 |
| 22 | 0 | +0.014 |
| 23 | 0 | +0.014 |
| 24 | −0.075 | −0.061 |

As shown in Table 10, the coating on the surface Nos. 19 and 20 satisfies the condition (11). Therefore, retardation produced by the surface Nos. 19 and 20 assumes a positive value. The positive retardation cancels the negative retardation introduced by the other surfaces of the objective. Consequently, after passage through the objective, the total retardation is about −0.06 degree. Retardation over the entire aperture is such as that shown by curve J in the graph of FIG. 24. Thus, it will be understood that retardation can be reduced to approximately zero throughout the aperture. In other words, it is possible to compensate for retardation introduced by the objective at an extremely high level by a relatively simple arrangement in which a single-layer coating satisfying the conditions (11) and (13) is provided on the surface No. 19, which is a cemented surface, and a single-layer coating satisfying the conditions (11), (13) and (14) is provided on the surface No. 20, which is an air contact surface.

EXAMPLE 5

Figure 25:
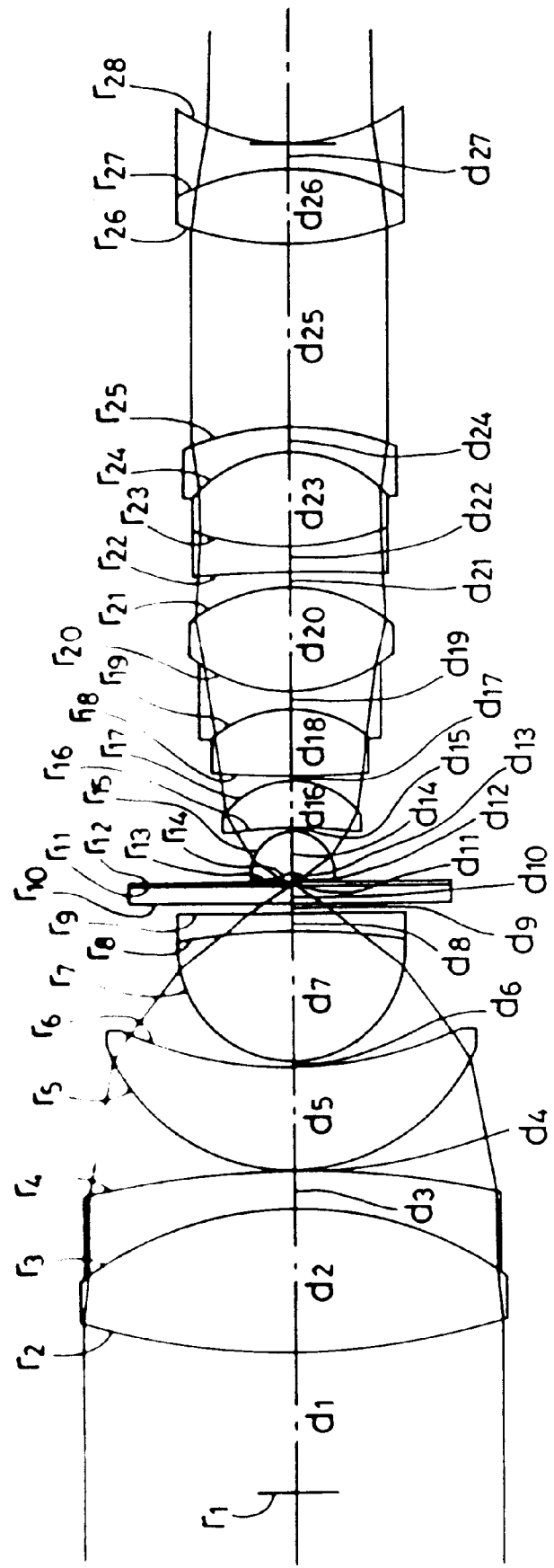
FIG. 25 is a sectional view of the entire optical system, including a condenser and an objective, which is used in Example 5 of the present invention.

In this example, the condenser 4 and objective 6 in the polarizing microscope shown in FIG. 30 are oil immersion lenses, and the oil contact surface of the condenser 4 is provided with a single-layer coating to eliminate retardation in the overall polarization performance of the condenser 4 and objective 6. The condenser is the same as that used in Examples 1, 2 and 3, and the objective is the same as that used in Example 4. The arrangement according to this example is shown in FIG. 25. Lens data concerning the condenser and objective lens systems is shown in Table 11 (shown later).

In the lens data shown in Table 11, the surface Nos. 2 to 9 form the condenser, and the surface Nos. 13 to 28 form the objective. A single-layer coating (material: $MgF_2$; the refractive index for the spectral d-line: 1.38; and the optical thickness: 190 nanometers) is provided on each of the air contact surfaces of the lenses forming the condenser and objective, i.e. the surface Nos. 2, 4 to 7, 15 to 18, 21 to 22, 25 to 26 and 28. Retardations introduced by the lens surfaces in a ray having an azimuth angle of 45 degrees and passing through the optical system arranged as stated above are shown in Table 12 below.

TABLE 12

| Surface No. | Retardation (degrees) | Cumulative total (degrees) |
|---|---|---|
| 1 | 0 | 0 |
| 2 | −0.039 | −0.039 |
| 3 | 0 | −0.039 |
| 4 | −0.125 | −0.164 |
| 5 | −1.05 | −1.214 |
| 6 | −0.018 | −1.232 |
| 7 | −0.726 | −1.958 |
| 8 | 0 | −1.958 |
| 9 | 0 | −1.958 |
| 10 | 0 | −1.958 |
| 11 | 0 | −1.958 |
| 12 | 0 | −1.958 |
| 13 | 0 | −1.958 |
| 14 | 0 | −1.958 |
| 15 | −0.907 | −2.865 |
| 16 | −0.095 | −2.96 |
| 17 | −0.274 | −3.234 |
| 18 | −0.005 | −3.239 |
| 19 | 0 | −3.239 |
| 20 | 0 | −3.239 |
| 21 | −0.384 | −3.623 |
| 22 | −0.005 | −3.628 |
| 23 | 0 | −3.628 |
| 24 | 0 | −3.628 |
| 25 | −0.089 | −3.717 |

TABLE 12-continued

| Surface No. | Retardation (degrees) | Cumulative total (degrees) |
|---|---|---|
| 26 | −0.08 | −3.797 |
| 27 | 0 | −3.797 |
| 28 | −0.079 | −3.876 |

Figure 26:
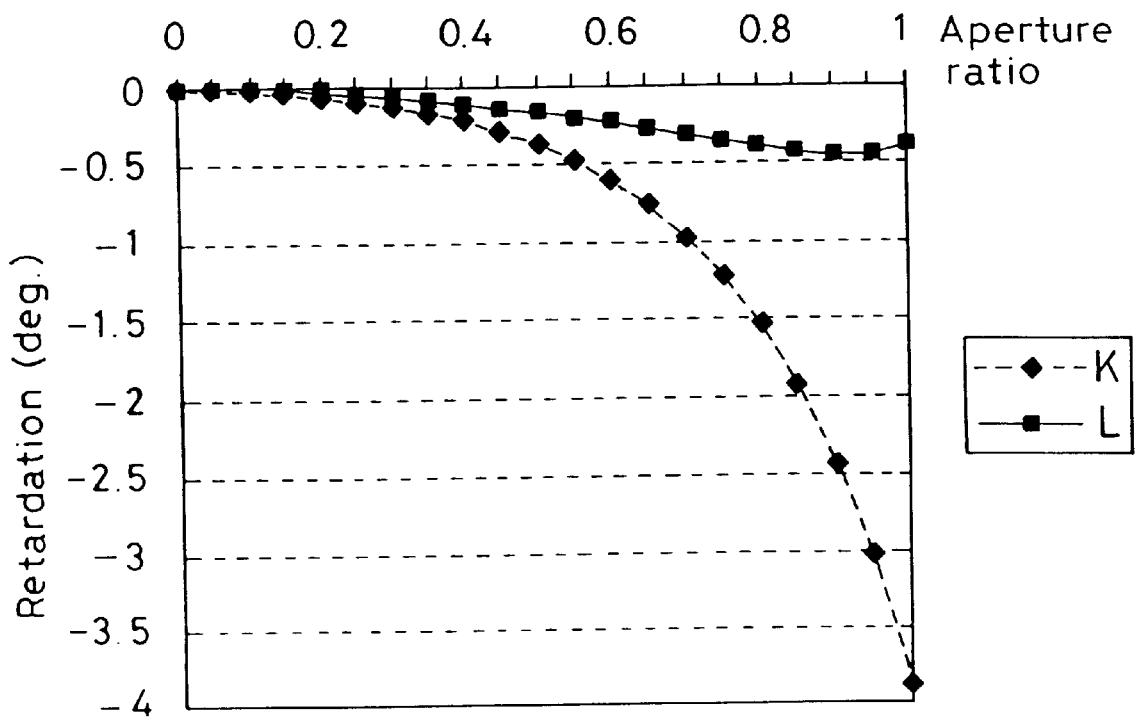
FIG. 26 is a diagram showing retardation with respect to the optical system shown in FIG. 25.
Figure 27:
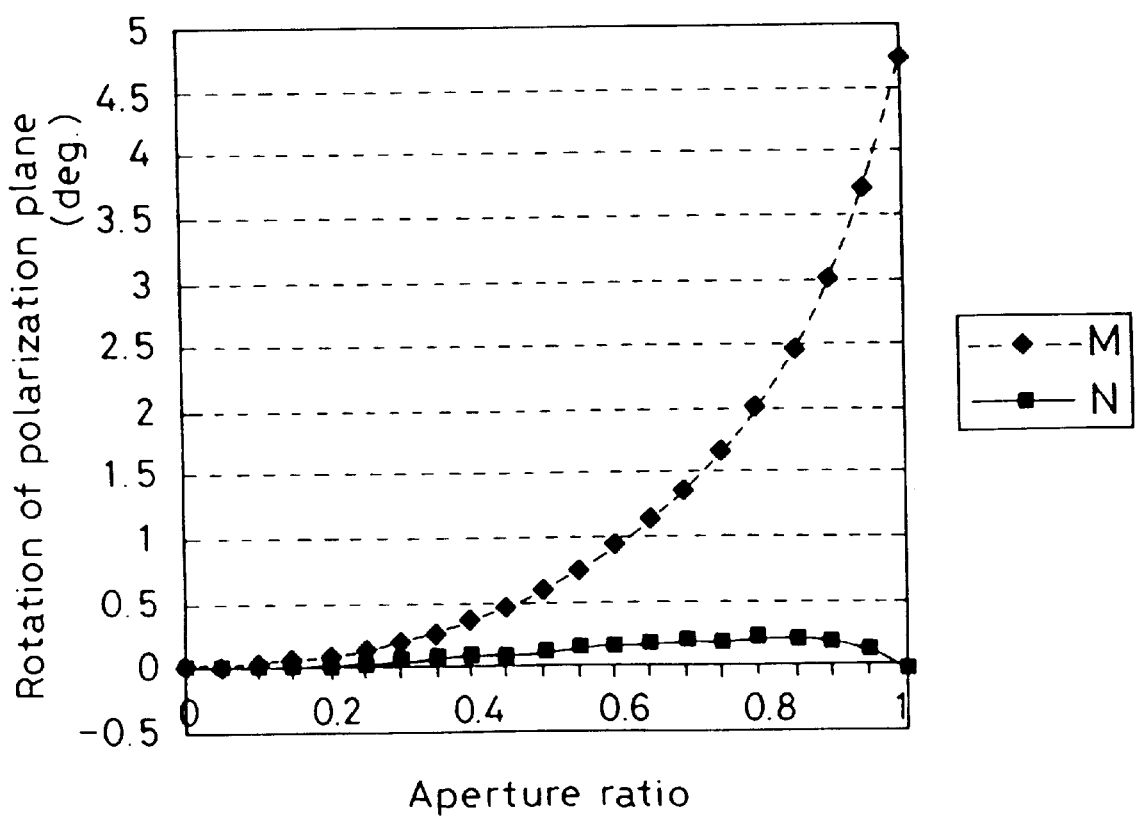
FIG. 27 is a diagram showing rotation of the polarization plane with respect to the optical system shown in FIG. 25 and also showing rotation of the polarization plane produced when an optical system of FIG. 28 is added to the optical system of FIG. 25.

As shown in Table 12, negative retardations are accumulated, and after passage through the entire optical system, the total retardation has reached about −4 degrees. Retardation introduced in a ray having an azimuth angle of 45 degrees and passing through the optical system arranged as stated above is shown by curve K in FIG. 26 with respect to the aperture ratio. Similarly, rotation of the polarization plane introduced in the ray is shown by curve M in FIG. 27 with respect to the aperture ratio. In this case, the EF value for the spectral d-line in the entire optical system is found to be about 1,080 by calculation.

In Examples 1 to 4, polarization compensation is performed independently for the condenser as an illumination optical system or for the objective as an image-forming optical system. In this example, polarization compensation for the entire optical system, including both the condenser and the objective, is performed in the illumination optical system.

The condenser is an oil immersion lens. By using an arrangement according to the present invention for the condenser, polarization compensation effect can be obtained. More specifically, the surface No. 9, which is the oil contact surface of the condenser, is provided with a single-layer coating having a refractive index lower or higher than the refractive indices of the oil and glass. By doing so, it is possible to reduce a large negative retardation accumulated after passage through the entire optical system. Rotation of the polarization plane can be compensated by placing in the illumination optical system a $\lambda/2$ wave plate and an optical system which is formed from an uncoated refracting surface and whose refracting power is zero.

In this example, to cancel retardation, the surface No. 9 is provided with a single-layer coating (material: $MgF_2$; the refractive index for the spectral d-line: 1.38; and the optical thickness: 173 nanometers). The refractive indices of the media on the front and back sides of the single-layer coating are $n_4=1.72825$ and $n_5=1.515$, respectively. Therefore, the conditions (11) and (13) are satisfied. Retardations produced by the lens surfaces in this arrangement are shown in Table 13 below.

TABLE 13

| Surface No. | Retardation (degrees) | Cumulative total (degrees) |
|---|---|---|
| 1 | 0 | 0 |
| 2 | −0.039 | −0.039 |
| 3 | 0 | −0.039 |
| 4 | −0.125 | −0.164 |
| 5 | −1.05 | −1.214 |
| 6 | −0.018 | −1.232 |
| 7 | −0.726 | −1.958 |
| 8 | 0 | −1.958 |
| 9 | +3.48 | +1.522 |
| 10 | 0 | +1.522 |
| 11 | 0 | +1.522 |
| 12 | 0 | +1.522 |
| 13 | 0 | +1.522 |

TABLE 13-continued

| Surface No. | Retardation (degrees) | Cumulative total (degrees) |
|---|---|---|
| 14 | 0 | +1.522 |
| 15 | −0.907 | +0.615 |
| 16 | −0.095 | +0.52 |
| 17 | −0.274 | +0.246 |
| 18 | −0.005 | +2.241 |
| 19 | 0 | +2.241 |
| 20 | 0 | +2.241 |
| 21 | −0.384 | −0.143 |
| 22 | −0.005 | −0.148 |
| 23 | 0 | −0.148 |
| 24 | 0 | −0.148 |
| 25 | −0.089 | −0.237 |
| 26 | −0.08 | −0.317 |
| 27 | 0 | −0.317 |
| 28 | −0.079 | −0.396 |

Figure 28:
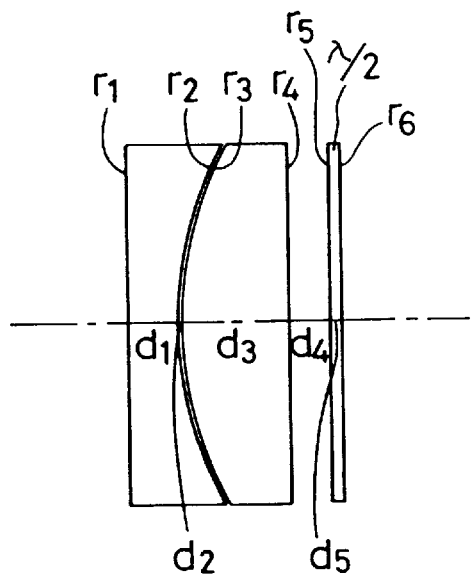
FIG. 28 is a sectional view of a rectifier used in Example 5 of the present invention.

As will be understood from Table 13, the single-layer coating on the surface No. 9 produces a large positive retardation to cancel the negative retardation introduced by the entire optical system. Consequently, after passage through the entire optical system, the retardation has been reduced to a value much smaller than in the case of Table 12. To cancel rotation of the polarization plane, a rectifier which is formed from an uncoated refracting surface and whose refracting power is zero, as shown in the lens data in Table 14, is placed in front of the condenser, together with a $\lambda/2$ wave plate. The rectifier is shown in FIG. 28. With this arrangement, retardation and rotation of the polarization plane can be effectively compensated as shown by curves L and N in the graphs of FIGS. 26 and 27. The curves L and N show retardation and rotation of the polarization plane, respectively, introduced in a ray having an azimuth angle of 45 degrees and passing through the entire optical system with respect to the aperture ratio.

Thus, polarization compensation for the entire optical system can be accomplished in the illumination optical system. Regarding retardation in particular, a remarkable compensating effect can be obtained by a very simple and easy operation, that is, by providing a single-layer coating on the oil contact surface of the condenser. This arrangement enables the EF value to be further improved. When only the rotation of the polarization plane is compensated by using the rectifier, the EF value is improved to about 7,380 at the most. By using the coating on the surface No. 9 in combination with the rectifier, the EF value is improved to as high a level as about 153,940.

Tables 1, 5, 6, 7, 8, 11 and 14 showing the lens data in the above-described Examples 1 to 5 are shown below.

TABLE 1

| Surface No. | Radius of curvature | Surface separation | Refractive index of d-line | Abbe's No. of d-line |
|---|---|---|---|---|
| 0 | $r_0 = \infty$ | $d_0 = 8.4$ | | |
| 1 | $r_1 = 43.66$ | $d_1 = 9.0$ | $n_1 = 1.56873$ | $v_1 = 63.2$ |
| 2 | $r_2 = -21.71$ | $d_2 = 1.9$ | $n_2 = 1.78472$ | $v_2 = 25.7$ |
| 3 | $r_3 = -61.47$ | $d_3 = 0.3$ | | |
| 4 | $r_4 = 12.79$ | $d_4 = 6.4$ | $n_3 = 1.58913$ | $v_3 = 61.0$ |
| 5 | $r_5 = 24.9$ | $d_5 = 0.3$ | | |
| 6 | $r_6 = 7.07$ | $d_6 = 8.0$ | $n_4 = 1.62041$ | $v_4 = 60.3$ |
| 7 | $r_7 = -34.01$ | $d_7 = 1.1$ | $n_5 = 1.72825$ | $v_5 = 28.5$ |
| 8 | $r_8 = \infty$ | $d_8 = 0.5$ | $n_6 = 1.515$ (Oil) | $v_6 = 43.1$ |
| 9 | $r_9 = \infty$ | $d_9 = 1.2$ | $n_7 = 1.5233$ | $v_7 = 58.9$ |

TABLE 1-continued

| Surface No. | Radius of curvature | Surface separation | Refractive index of d-line | Abbe's No. of d-line |
|---|---|---|---|---|
| | | | (Slide glass) | |

TABLE 5

| Surface No. | Radius of curvature | Surface separation | Refractive index of d-line | Abbe's No. of d-line |
|---|---|---|---|---|
| 1 | $r_1 = \infty$ | $d_1 = 4.0$ | $n_1 = 1.80518$ | $v_1 = 25.4$ |
| 2 | $r_2 = 37.45$ | $d_2 = 0.5$ | | |
| 3 | $r_3 = 37.45$ | $d_3 = 8.0$ | $n_2 = 1.80518$ | $v_2 = 25.4$ |
| 4 | $r_4 = \infty$ | $d_4 = 1.0$ | | |
| 5 | $r_5 = \infty$ | $d_5 = (\lambda/2$ wave plate) | | |
| 6 | $r_6 = \infty$ | $d_6 = 8.4$ | | |
| 7 | $r_7 = 43.66$ | $d_7 = 9.0$ | $n_3 = 1.56873$ | $v_3 = 63.2$ |
| 8 | $r_8 = -21.71$ | $d_9 = 1.9$ | $n_4 = 1.78472$ | $v_4 = 25.7$ |
| 9 | $r_9 = -61.47$ | $d_9 = 0.3$ | | |
| 10 | $r_{10} = 12.79$ | $d_{10} = 6.4$ | $n_5 = 1.58913$ | $v_5 = 61.0$ |
| 11 | $r_{11} = 24.9$ | $d_{11} = 0.3$ | | |
| 12 | $r_{12} = 7.07$ | $d_{12} = 8.0$ | $n_6 = 1.62041$ | $v_6 = 60.3$ |
| 13 | $r_{13} = -34.01$ | $d_{13} = 1.1$ | $n_7 = 1.72825$ | $v_7 = 28.5$ |
| 14 | $r_{14} = \infty$ | $d_{14} = 0.5$ | $n_8 = 1.515$ (Oil) | $v_8 = 43.1$ |
| 15 | $r_{15} = \infty$ | $d_{15} = 1.2$ | $n_9 = 1.5233$ (Slide glass) | $v_9 = 58.9$ |

TABLE 6

| Surface No. | Radius of curvature | Surface separation | Refractive index of d-line | Abbe's No. of d-line |
|---|---|---|---|---|
| 1 | $r_1 = \infty$ | $d_1 = 4.0$ | $n_1 = 1.80518$ | $v_1 = 25.4$ |
| 2 | $r_2 = 39.5$ | $d_2 = 0.5$ | | |
| 3 | $r_3 = 39.5$ | $d_3 = 8.0$ | $n_2 = 1.80518$ | $v_2 = 25.4$ |
| 4 | $r_4 = \infty$ | $d_4 = 3.0$ | | |
| 5 | $r_5 = \infty$ | $d_5 = (\lambda/2$ wave plate) | | |
| 6 | $r_6 = \infty$ | $d_6 = 8.4$ | | |
| 7 | $r_7 = 43.66$ | $d_7 = 9.0$ | $n_3 = 1.56873$ | $v_3 = 63.2$ |
| 8 | $r_8 = -21.71$ | $d_8 = 1.9$ | $n_4 = 1.78472$ | $v_4 = 25.7$ |
| 9 | $r_9 = -61.47$ | $d_9 = 0.3$ | | |
| 10 | $r_{10} = 12.79$ | $d_{10} = 6.4$ | $n_5 = 1.58913$ | $v_5 = 61.0$ |
| 11 | $r_{11} = 24.9$ | $d_{11} = 0.3$ | | |
| 12 | $r_{12} = 7.07$ | $d_{12} = 8.0$ | $n_6 = 1.62041$ | $v_6 = 60.3$ |
| 13 | $r_{13} = -34.01$ | $d_{13} = 1.1$ | $n_7 = 1.72825$ | $v_7 = 28.5$ |
| 14 | $r_{14} = \infty$ | $d_{14} = 0.5$ | $n_8 = 1.515$ (Oil) | $v_8 = 43.1$ |
| 15 | $r_{15} = \infty$ | $d_{15} = 1.2$ | $n_9 = 1.5233$ (Slide glass) | $v_9 = 58.9$ |

TABLE 7

| Surface No. | Radius of curvature | Surface separation | Refractive index of d-line | Abbe's No. of d-line |
|---|---|---|---|---|
| 1 | $r_1 = \infty$ | $d_1 = 4.0$ | $n_1 = 1.80518$ | $v_1 = 25.4$ |
| 2 | $r_2 = 37.86$ | $d_2 = 0.5$ | | |
| 3 | $r_3 = 37.86$ | $d_3 = 8.0$ | $n_2 = 1.80518$ | $v_2 = 25.4$ |
| 4 | $r_4 = \infty$ | $d_4 = 3.0$ | | |
| 5 | $r_5 = \infty$ | $d_5 = (\lambda/2$ wave plate) | | |
| 6 | $r_6 = \infty$ | $d_6 = 3.0$ | | |
| 7 | $r_7 = \infty$ | $d_7 = 4.0$ | $n_3 = 1.51633$ | $v_3 = 64.1$ |
| 8 | $r_8 = 38.63$ | $d_8 = 0.5$ | | |
| 9 | $r_9 = 38.63$ | $d_9 = 8.0$ | $n_4 = 1.51633$ | $v_4 = 64.1$ |

TABLE 7-continued

| Surface No. | Radius of curvature | Surface separation | Refractive index of d-line | Abbe's No. of d-line |
|---|---|---|---|---|
| 10 | $r_{10} = \infty$ | $d_{10} = 8.4$ | | |
| 11 | $r_{11} = 43.66$ | $d_{11} = 9.0$ | $n_5 = 1.56873$ | $v_5 = 63.2$ |
| 12 | $r_{12} = -21.71$ | $d_{12} = 1.9$ | $n_6 = 1.78472$ | $v_6 = 25.7$ |
| 13 | $r_{13} = -61.47$ | $d_{13} = 0.3$ | | |
| 14 | $r_{14} = 12.79$ | $d_{14} = 6.4$ | $n_7 = 1.58913$ | $v_7 = 61.0$ |
| 15 | $r_{15} = 24.9$ | $d_{15} = 0.3$ | | |
| 16 | $r_{16} = 7.07$ | $d_{16} = 8.0$ | $n_8 = 1.62041$ | $v_8 = 60.3$ |
| 17 | $r_{17} = -34.01$ | $d_{17} = 1.1$ | $n_9 = 1.72825$ | $v_9 = 28.5$ |
| 18 | $r_{18} = \infty$ | $d_{18} = 0.5$ | $n_{10} = 1.515$ (Oil) | $v_{10} = 43.1$ |
| 19 | $r_{19} = \infty$ | $d_{19} = 1.2$ | $n_{11} = 1.5233$ (Slide glass) | $v_{11} = 58.9$ |

TABLE 8

| Surface No. | Radius of curvature | Surface separation | Refractive index of d-line | Abbe's No. of d-line |
|---|---|---|---|---|
| 1 | $r_1 = \infty$ | $d_1 = 0.17$ | $n_1 = 1.52100$ (Cover glass) | $v_1 = 56.0$ |
| 2 | $r_2 = \infty$ | $d_2 = 0.13$ | $n_2 = 1.515$ (Oil) | $v_2 = 43$ |
| 3 | $r_3 = \infty$ | $d_3 = 0.30$ | $n_3 = 1.50378$ | $v_3 = 66.8$ |
| 4 | $r_4 = -1.44$ | $d_4 = 0.01$ | $n_4 = 1.56444$ (Cement) | $v_4 = 43.8$ |
| 5 | $r_5 = -1.44$ | $d_5 = 2.78$ | $n_5 = 1.78650$ | $v_5 = 50.0$ |
| 6 | $r_6 = -2.38$ | $d_6 = 0.10$ | | |
| 7 | $r_7 = -32.90$ | $d_7 = 3.01$ | $n_6 = 1.49700$ | $v_6 = 81.1$ |
| 8 | $r_8 = -5.32$ | $d_8 = 0.27$ | | |
| 9 | $r_9 = 118.41$ | $d_9 = 4.10$ | $n_7 = 1.43875$ | $v_7 = 95.0$ |
| 10 | $r_{10} = -7.84$ | $d_{10} = 0.01$ | $n_8 = 1.56444$ (Cement) | $v_8 = 43.8$ |
| 11 | $r_{11} = -7.84$ | $d_{11} = 1.09$ | $n_9 = 1.58144$ | $v_9 = 40.8$ |
| 12 | $r_{12} = 9.39$ | $d_{12} = 0.01$ | $n_{10} = 1.56444$ (Cement) | $v_{10} = 43.8$ |
| 13 | $r_{13} = 9.39$ | $d_{13} = 6.70$ | $n_{11} = 1.49700$ | $v_{11} = 81.1$ |
| 14 | $r_{14} = -9.40$ | $d_{14} = 0.84$ | | |
| 15 | $r_{15} = -111.95$ | $d_{15} = 1.49$ | $n_{12} = 1.59551$ | $v_{12} = 39.2$ |
| 16 | $r_{16} = 15.82$ | $d_{16} = 0.01$ | $n_{13} = 1.56444$ (Cement) | $v_{13} = 43.8$ |
| 17 | $r_{17} = 15.82$ | $d_{17} = 6.06$ | $n_{14} = 1.43389$ | $v_{14} = 95.2$ |
| 18 | $r_{18} = -7.78$ | $d_{18} = 0.01$ | $n_{15} = 1.56444$ (Cement) | $v_{15} = 43.8$ |
| 19 | $r_{19} = -7.78$ | $d_{19} = 1.60$ | $n_{16} = 1.67790$ | $v_{16} = 5.53$ |
| 20 | $r_{20} = -17.07$ | $d_{20} = 11.20$ | | |
| 21 | $r_{21} = 18.69$ | $d_{21} = 4.82$ | $n_{17} = 1.58144$ | $v_{17} = 40.8$ |
| 22 | $r_{22} = -14.52$ | $d_{22} = 0.01$ | $n_{18} = 1.56444$ (Cement) | $v_{18} = 43.8$ |
| 23 | $r_{23} = -14.52$ | $d_{23} = 1.56$ | $n_{19} = 1.50378$ | $v_{19} = 66.8$ |
| 24 | $r_{24} = 13.06$ | | | |

TABLE 11

| Surface No. | Radius of curvature | Surface separation | Refractive index of d-line | Abbe's No. of d-line |
|---|---|---|---|---|
| 1 | $r_1 = \infty$ | $d_1 = 8.40$ | $n_1 = 1.56873$ | $v_1 = 63.2$ |
| 2 | $r_2 = 43.66$ | $d_2 = 9.00$ | $n_2 = 1.78472$ | $v_2 = 25.7$ |
| 3 | $r_3 = -21.71$ | $d_3 = 1.90$ | | |
| 4 | $r_4 = -61.47$ | $d_4 = 0.30$ | | |
| 5 | $r_5 = 12.79$ | $d_5 = 6.40$ | $n_3 = 1.58913$ | $v_3 = 61.0$ |
| 6 | $r_6 = 24.90$ | $d_6 = 0.30$ | | |
| 7 | $r_7 = 7.07$ | $d_7 = 8.00$ | $n_4 = 1.62041$ | $v_4 = 60.3$ |
| 8 | $r_8 = -34.01$ | $d_8 = 1.10$ | $n_5 = 1.72825$ | $v_5 = 28.5$ |
| 9 | $r_9 = \infty$ | $d_9 = 0.50$ | $n_6 = 1.515$ (Oil) | $v_6 = 43$ |
| 10 | $r_{10} = \infty$ | $d_{10} = 1.18$ | $n_7 = 1.52330$ (Slide glass) | $v_7 = 58.9$ |

TABLE 11-continued

| Surface No. | Radius of curvature | Surface separation | Refractive index of d-line | Abbe's No. of d-line |
|---|---|---|---|---|
| 11 | $r_{11} = \infty$ | $d_{11} = 0.17$ | $n_8 = 1.52100$ (Cover glass) | $v_8 = 56.0$ |
| 12 | $r_{12} = \infty$ | $d_{12} = 0.13$ | $n_9 = 1.515$ (Oil) | $v_9 = 43$ |
| 13 | $r_{13} = \infty$ | $d_{13} = 0.30$ | $n_{10} = 1.50378$ | $v_{10} = 66.8$ |
| 14 | $r_{14} = -1.44$ | $d_{14} = 2.78$ | $n_{11} = 1.78650$ | $v_{11} = 50.0$ |
| 15 | $r_{16} = -2.38$ | $d_{15} = 0.10$ | | |
| 16 | $r_{17} = -32.90$ | $d_{16} = 3.01$ | $n_{12} = 1.49700$ | $v_{12} = 81.1$ |
| 17 | $r_{17} = -5.32$ | $d_{17} = 0.27$ | | |
| 18 | $r_{18} = 118.41$ | $d_{18} = 4.10$ | $n_{13} = 1.43875$ | $v_{13} = 95.0$ |
| 19 | $r_{19} = -7.84$ | $d_{19} = 1.09$ | $n_{14} = 1.58144$ | $v_{14} = 40.8$ |
| 20 | $r_{20} = 9.39$ | $d_{20} = 6.70$ | $n_{15} = 1.49700$ | $v_{15} = 81.1$ |
| 21 | $r_{21} = -9.40$ | $d_{21} = 0.84$ | | |
| 22 | $r_{22} = -111.95$ | $d_{22} = 1.49$ | $n_{16} = 1.59551$ | $v_{16} = 39.2$ |
| 23 | $r_{23} = 15.82$ | $d_{23} = 6.06$ | $n_{17} = 1.43389$ | $v_{17} = 95.2$ |
| 24 | $r_{24} = -7.78$ | $d_{24} = 1.60$ | $n_{18} = 1.67790$ | $v_{18} = 55.3$ |
| 25 | $r_{25} = -17.07$ | $d_{25} = 11.20$ | | |
| 26 | $r_{26} = 18.69$ | $d_{26} = 4.82$ | $n_{19} = 1.58144$ | $v_{19} = 40.8$ |
| 27 | $r_{27} = -14.52$ | $d_{27} = 1.56$ | $n_{20} = 1.50378$ | $v_{20} = 66.8$ |
| 28 | $r_{28} = 13.06$ | | | |

TABLE 14

| Surface No. | Radius of curvature | Surface separation | Refractive index of d-line | Abbe's No. of d-line |
|---|---|---|---|---|
| 1 | $r_1 = \infty$ | $d_1 = 4.0$ | $n_1 = 1.80518$ | $v_1 = 25.4$ |
| 2 | $r_2 = 30.5$ | $d_2 = 0.2$ | | |
| 3 | $r_3 = 30.5$ | $d_3 = 8.0$ | $n_2 = 1.80518$ | $v_2 = 25.4$ |
| 4 | $r_4 = \infty$ | $d_4 = 3.0$ | | |
| 5 | $r_5 = \infty$ | $d_5 = (\lambda/2 \text{ wave plate})$ | | |
| 6 | $r_6 = \infty$ | | | |

Figure 29:
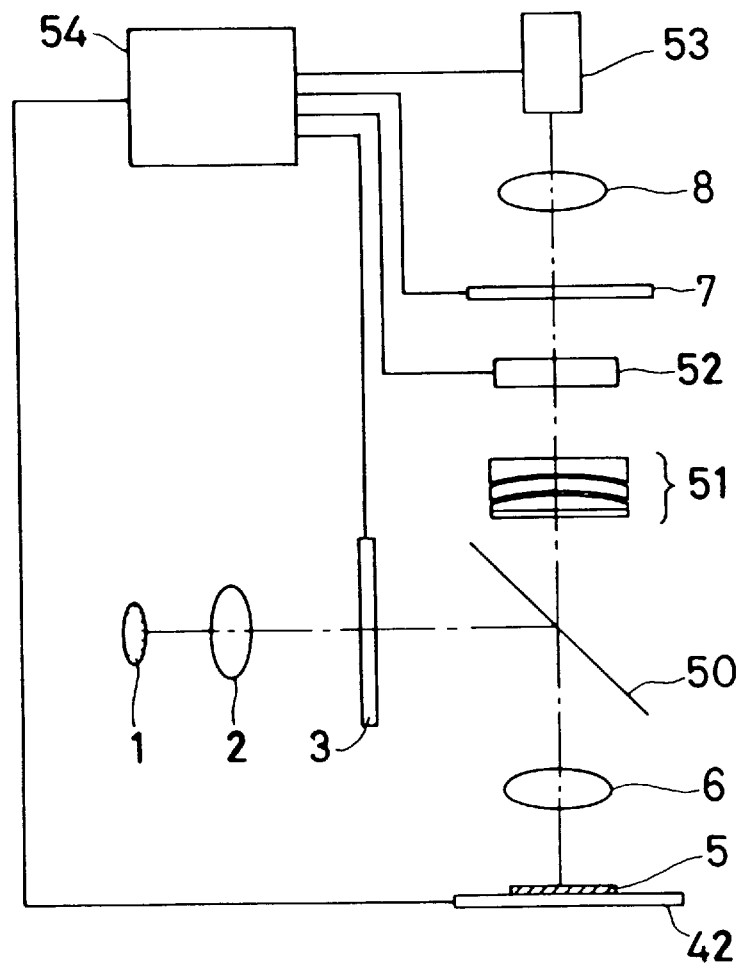
FIG. 29 is a diagram showing an example in which the optical system having a polarization compensating optical system is used in a birefringence measuring apparatus.

FIG. 29 is a diagram showing an example in which the optical system having a polarization compensating optical system is used in a birefringence measuring apparatus. The birefringence measuring apparatus utilizes the optical system of a polarizing microscope. Therefore, the same arrangements as those shown in FIG. 16 are denoted by the same reference numerals, and a description of the functions and operations thereof is omitted. In FIG. 29, illuminating light from a light source 1 passes successively through a collector lens 2 and a polarizer 3. Then, the light is bent at right angles by a half-mirror 50 and applied to a specimen 5 through an objective 6. Light reflected from the specimen 5 contains retardation due to birefringent characteristics of the specimen 5. The reflected light passes through the objective 6 again. Then, the light is transmitted by the half-mirror 50 to enter a polarization compensating optical system 51. The polarization compensating optical system 51 is formed from coated surfaces and uncoated surfaces to compensate for rotation of the polarization plane and retardation introduced by the objective 6.

Accordingly, polarized light passing through the polarization compensating optical system 51 contains only a retardation produced by the specimen 5. When the polarized light containing the retardation produced by the specimen 5 is incident on an analyzer 7, a part of the polarized light passes through the analyzer 7 and reaches a photodetector 53 through an image-forming lens 8. The light intensity detected by the photodetector 53 is sent to an arithmetic unit 54.

A compensator 52 placed in front of the analyzer 7 is an optical element having the function (characteristics) of changing the retardation contained in the polarized light passing through the polarization compensating optical system 51. Therefore, the transmission azimuths of the polarizer 3 and analyzer 7, together with the azimuth of the neutral axis of the specimen 5 having birefringent characteristics and so forth, are appropriately set, and the compensator 52 is adjusted to measure the light intensity detected by the photodetector 53. Thus, retardation introduced by the observed portion of the specimen 5 can be measured. It is possible according to instructions from the arithmetic unit 54 to adjust the transmission azimuths of the polarizer 3 and analyzer 7, the position and azimuth of the specimen 5 or the compensator 52 according to the intensity measured with the photodetector 53.

As will be clear from the foregoing description, according to the present invention, retardation produced by at least one refracting surface provided with a coating cancels retardation introduced by the optical system to be compensated. Thus, polarization compensation can be performed with high accuracy.

Further, rotation of the polarization plane and retardation, which cause the polarization performance to be deteriorated, are suppressed by using a combination of a $\lambda/2$ wave plate, an optical system having at least one uncoated refracting surface and an optical system having at least one refracting surface provided with a coating. Thus, the polarization performance can be markedly improved in comparison to a conventional rectifier that compensates for only the rotation of the polarization plane.

The above-described coating is a single-layer coating having a refractive index $n_1$. Compensation for retardation can be performed with relative ease by arranging the coating such that the condition (11) is satisfied in relation to the refractive indices $n_0$ and $n_2$ of the media on the two opposite sides of the single-layer coating.

What is claimed is:

1. A polarization compensated optical system, comprising:

a polarization compensating optical system; and a remaining optical system, said polarization compensating optical system comprising:

a half-wave plate;

a first optical system having at least one uncoated refracting surface; and a second optical system having at least one refracting surface provided with a coating, wherein a total rotation of a polarization plane introduced in rays passing through said polarization compensated optical system is reduced to approximately zero by a rotation of the polarization plane produced by said first optical system, wherein a total retardation introduced in said rays is reduced to approximately zero by a retardation produced by said second optical system, wherein a total refracting power of said first optical system and second optical system is approximately zero, wherein said half-wave plate is placed between said remaining optical system and said first optical system, wherein the retardation produced by said second optical system is equal in sign to a retardation introduced by said remaining optical system, and wherein said first optical system and said second optical system are placed on a same side of said half-wave plate.

2. An optical system according to claim 1, further comprising:

an illumination optical system and image-forming optical system of a microscope optical system, wherein polarization compensation for said optical system having a polarization compensating optical system is performed in one of said illumination optical system and said image-forming optical system.

* * * * *